(12) United States Patent
Tsujimura et al.

(10) Patent No.: US 10,357,908 B2
(45) Date of Patent: Jul. 23, 2019

(54) METHOD FOR MANUFACTURING RESIN SUBSTRATE WITH HARD COATING FILM AND RESIN SUBSTRATE WITH HARD COATING FILM

(71) Applicant: AGC Inc., Chiyoda-ku (JP)

(72) Inventors: Hitoshi Tsujimura, Chiyoda-ku (JP); Yuji Yamamoto, Chiyoda-ku (JP); Kazuhiro Onuki, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 523 days.

(21) Appl. No.: 15/091,233

(22) Filed: Apr. 5, 2016

(65) Prior Publication Data

US 2016/0214294 A1 Jul. 28, 2016

Related U.S. Application Data

(63) Continuation of application No. PCT/JP2014/077902, filed on Oct. 21, 2014.

(30) Foreign Application Priority Data

Oct. 25, 2013 (JP) .................................. 2013-222552

(51) Int. Cl.
| | |
|---|---|
| *B29C 45/14* | (2006.01) |
| *B32B 27/08* | (2006.01) |
| *B32B 27/24* | (2006.01) |
| *B32B 27/30* | (2006.01) |
| *B29C 37/00* | (2006.01) |
| *B29L 31/00* | (2006.01) |

(Continued)

(52) U.S. Cl.
CPC .... *B29C 45/14811* (2013.01); *B29C 37/0025* (2013.01); *B29C 37/0032* (2013.01);
(Continued)

(58) Field of Classification Search
None
See application file for complete search history.

(56) References Cited

U.S. PATENT DOCUMENTS

2012/0263932 A1* 10/2012 Yamamoto ............... B05D 7/52
428/216
2012/0308812 A1 12/2012 Shibuya et al.

FOREIGN PATENT DOCUMENTS

CN 102666095 9/2012
EP 2 517 878 A1 10/2012
(Continued)

OTHER PUBLICATIONS

Thermoforming vs Injection Molding; Ray Products Co., Inc.; as published at https://www.rayplastics.com/learn-about-thermoforming/thermoforming-vs-injection-molding/ on Jun. 2013.*

(Continued)

*Primary Examiner* — Michael P. Rodriguez
(74) *Attorney, Agent, or Firm* — Oblon, McClelland, Maier & Neustadt, L.L.P.

(57) ABSTRACT

Provided are: a method for efficiently manufacturing an abrasion-resistant resin substrate with a hard coating film with adhesiveness and weather resistance obtained by sequentially laminating a primer layer and a hard coating layer on a resin substrate without decreasing the adhesiveness and the weather resistance; and a resin substrate with hard coat film obtained by this method. A method for manufacturing a resin substrate with a hard coating film having a primer layer and a hard coating layer, includes: a step of forming a primer layer containing an acrylic polymer on one main surface of a resin film to obtain a resin film laminate; a step of forming a resin substrate by injection molding on another main surface of the resin film in the resin film laminate; and a step of applying a hard coating layer forming composition on the primer layer and curing the hard coating layer forming composition.

6 Claims, 4 Drawing Sheets

(51) Int. Cl.
  *B29L 31/30*   (2006.01)
  *B05D 1/30*   (2006.01)
  *B29K 67/00*   (2006.01)
  *B29K 633/04*  (2006.01)

(52) U.S. Cl.
  CPC .............. *B32B 27/08* (2013.01); *B32B 27/24* (2013.01); *B32B 27/308* (2013.01); *B05D 1/30* (2013.01); *B05D 2201/00* (2013.01); *B29C 2037/0042* (2013.01); *B29K 2067/00* (2013.01); *B29K 2633/08* (2013.01); *B29K 2995/0026* (2013.01); *B29L 2031/30* (2013.01); *B29L 2031/7782* (2013.01); *B32B 2307/584* (2013.01); *B32B 2307/712* (2013.01); *B32B 2307/718* (2013.01); *B32B 2419/00* (2013.01); *B32B 2605/006* (2013.01)

(56) References Cited

FOREIGN PATENT DOCUMENTS

| EP | 2 540 498 A1 | 1/2013 |
|---|---|---|
| JP | 2001-315271 | 11/2001 |
| JP | 2002-36870 | 2/2002 |
| JP | 2006-35519 | 2/2006 |
| JP | 2006035519 A * | 2/2006 |
| JP | 2014-162087 | 9/2014 |
| JP | 2015-30165 A | 2/2015 |
| KR | 10-2012-0107093 | 9/2012 |
| WO | WO 2011/078178 A1 | 6/2011 |
| WO | WO 2012/046784 A1 | 4/2012 |

OTHER PUBLICATIONS

English translation of International Preliminary Report on Patentability and Written Opinion dated May 6, 2016 in PCT/JP2014/077902.
Extended European Search Report dated Nov. 17, 2016 in Patent Application No. 14855438.9.
International Search Report dated Jan. 20, 2015 in PCT/JP2014/077902, filed on Oct. 21, 2014( with English Translation of Categories of Cited Documents).
Written Opinion dated Jan. 20, 2015 in PCT/JP2014/077902, filed on Oct. 21, 2014.

\* cited by examiner

METHOD FOR MANUFACTURING RESIN SUBSTRATE WITH HARD COATING FILM AND RESIN SUBSTRATE WITH HARD COATING FILM

CROSS-REFERENCE TO RELATED APPLICATIONS

This application is a continuation of prior International Application No. PCT/JP2014/077902, filed on Oct. 21, 2014 which is based upon and claims the benefit of priority from Japanese Patent Application No. 2013-222552, filed on Oct. 25, 2013; the entire contents of all of which are incorporated herein by reference.

TECHNICAL FIELD

An embodiment of the present invention relates to a method for manufacturing a resin substrate with a hard coating film and a resin substrate with a hard coating film obtained by the method.

BACKGROUND

In recent years, a transparent resin plate is increasingly demanded, in place of an inorganic glass plate hitherto, as a window material for vehicles such as automobiles and window glass for building material attached to architectures such as houses, buildings and the like. In particular, for the vehicles such automobiles and the like, it is proposed to use a transparent resin plate for the window material for reduction in weight, and an aromatic polycarbonate-based transparent resin plate is especially excellent in fracture resistance, transparency, light weight, easy workability and so on, and its use as a promising window material for vehicle is under consideration. However, such a transparent resin plate has a problem in abrasion resistance and weather resistance in use in place of the inorganic glass plate.

Hence, for the purpose of improving the abrasion resistance and the weather resistance of the transparent resin plate, it is proposed to use various hard coating materials, in particular, a silicone-based hard coating material to form a coating film, namely, a hard coating layer on the surface of the transparent resin plate. Further, it is also proposed to provide a primer layer on the transparent resin plate in order to improve the adhesiveness between the hard coating layer and the transparent resin plate at that time. A method for forming the hard coating film composed of the hard coating layer and the primer layer is generally a two-coating method of a wet method of sequentially applying liquid compositions for forming the respective layers on the transparent resin substrate and drying them.

On the other hand, because the two-coating method of sequentially applying the respective layers and drying them is low in productivity in the method for forming the hard coating film composed of the hard coating layer and the primer layer on the transparent substrate, Patent Reference 1 (JP-A 2006-035519) discloses a method for manufacturing a resin substrate with a hard coating layer with good productivity by forming the primer layer on a polycarbonate resin film by coextrusion, and injection-molding a polycarbonate resin substrate on the surface on the opposite side to the primer layer of the resin film.

However, the method in Patent Reference 1 has such a problem that though the productivity is improved, the weather resistance is sacrificed because the physical property of the resin constituting the primer layer is made suitable for molding by coextrusion. Hence, a method for manufacturing a resin substrate with a hard coating layer with good productivity while sufficiently keeping the adhesiveness and the weather resistance in a resin substrate with a hard coating layer to be obtained is hoped for.

SUMMARY OF THE INVENTION

An object of the present invention is to provide a method for efficiently manufacturing an abrasion resistant resin substrate with a hard coating film with adhesiveness and weather resistance obtained by sequentially applying a primer layer forming composition and a hard coating layer forming composition on a resin substrate and drying them without decreasing the adhesiveness and the weather resistance, and to provide an abrasion resistant resin substrate with a hard coating film excellent in adhesiveness and weather resistance and high in productivity obtained by the method.

The present invention provides a method for manufacturing a resin substrate with a hard coating film and a resin substrate with a hard coating film having the following configurations.

[1] A method for manufacturing a resin substrate with a hard coating film having a resin substrate formed by injection molding, a resin film on one main surface of the resin substrate and a hard coating film including at least a primer layer and a hard coating layer laminated on the resin film, the method comprising:

a step (1) of preparing the resin film with a thickness of 150 to 400 μm and made of a same kind of resin as a resin constituting the resin substrate, applying a primer layer forming composition containing a primer resin component containing an acrylic polymer (A) having a mass average molecular weight of 200,000 to 1,000,000 as a main component and a solvent by a wet method on one main surface of the resin film and drying the primer layer forming composition to form the primer layer having a content of the solvent of less than 1.5 mass % relative to 100 mass % of a total solid content, to obtain a resin film laminate;

a step (2) of forming the resin substrate by injection molding on another main surface of the resin film in the resin film laminate, to obtain a resin substrate with a resin film laminate; and a step (3) of applying a hard coating layer forming composition containing an organopolysiloxane (S) as a main component on the primer layer in the resin substrate with a resin film laminate and curing the hard coating layer forming composition, to obtain the resin substrate with a hard coating film.

[2] The manufacturing method according to [1], wherein the resin constituting the resin substrate and the resin film is polycarbonate.

[3] The manufacturing method according to [1], wherein the primer layer forming composition contains a non-polymerizable ultraviolet absorbent, and a content of the ultraviolet absorbent is 5 to 50 mass % relative to 100 mass % of the primer resin component.

[4] The manufacturing method according to [1], wherein the organopolysiloxane (S) contains: an organopolysiloxane (a) containing silicon-containing bond units represented by following T1 to T3 at a ratio among numbers of the units of T1:T2:T3=0 to 5:30 to 45:50 to 70 and a ratio of T3/T2≥1.5, and having a ratio of the number of hydroxyl groups (Hy) bonded to silicon atoms relative to the number of alkoxy groups (Al) bonded to silicon atoms in a molecule, (Hy)/(Al) of 12.0 to 100 on a molecular average, and a mass average molecular weight of 800 to 8,000; and an organopolysiloxane (b) having silicon-containing bond units represented by the following T1 to T3 and having a mass average molecular weight of 1/10 to 1/1.5 times the mass average molecular weight of the organopolysiloxane (a) at a ratio of 100 to 500 mass % relative to 100 mass % of the organopolysiloxane (a), T1: R—Si(—OX)$_2$(—O*—)

T2: R—Si(—OX)(—O*—)$_2$

T3: R—Si(—O*—)$_3$ where R represents an alkyl group having 1 to 6 carbon atoms, X represents a hydrogen atom or an alkyl group having 1 to 3 carbon atoms, and O* represents an oxygen atom linking two silicon atoms.
[5] The manufacturing method according to [1], wherein the application of the hard coating layer forming composition in the step (3) is performed by a flow coating method.
[6] A resin substrate with a hard coating film obtained by the manufacturing method according to [1].

In this description, the "hard coating film" refers to a coating film having a hard coating layer at least in a surface layer portion formed on the resin substrate. In the present invention, the whole coating film obtained by sequentially applying a primer layer forming composition and a hard coating layer forming composition on a resin substrate and drying them is referred to as a "hard coating film." More specifically, in the present invention, by applying the primer layer forming composition on the resin substrate and drying it, a primer layer is formed. Further, by applying the hard coating layer forming composition on the primer layer and drying it, a hard coating layer is formed. The hard coating film thus obtained is a hard coating film composed of the primer layer and the hard coating layer.

Further, in the present invention, the primer layer and the hard coating layer in the resin substrate with a hard coating film to be obtained may have a mixed portion with each other at the interface between the layers, but at least those layers are layers recognizable as independent layers under a microscope or the like. In consideration of the state of the interface between the layers, in the description, the film thickness of each of the layers means the thickness of the layer when it is independently formed on a substrate where a stable interface with a surface to be formed such as the resin substrate is obtained unless otherwise stated.

In the description, the "main component" and "main body" mean that each of various resin components or the solid content of the primer layer forming composition, the hard coating layer forming composition or the like contains 50 to 100 mass % of a material being the main component or main body relative to the whole material of each of them.

In the description, the "solid content" of each of the layer forming compositions refer to the whole of components other than components which vaporize in the layer forming process and thus not remaining in a layer to be obtained such as a solvent or the like contained in the composition, namely, whole of non-volatile components. More specifically, the "solid content" in each of the layer forming compositions refers to residual components after the composition is kept at 150° C. for 45 minutes.

Besides, the "acrylic polymer" collectively refers to a homopolymer and a copolymer containing polymerization units based on at least one kind (hereinafter, "acrylic monomer") of an acrylic acid, a methacrylic acid, and various derivatives obtained by reaction of a carboxyl group contained therein, and a total of the polymerization units based on the acrylic monomer of 50 mol % or more relative to the total of polymerization units of the polymer.

According to the present invention, it is possible to efficiently manufacture an abrasion resistant resin substrate with a hard coating film with adhesiveness and weather resistance obtained by sequentially applying a primer layer forming composition and a hard coating layer forming composition on a resin substrate and drying them without decreasing the adhesiveness and the weather resistance. It is also possible to provide an abrasion resistant resin substrate with a hard coating film excellent in adhesiveness and weather resistance and high in productivity.

DETAILED DESCRIPTION

Figure 1:
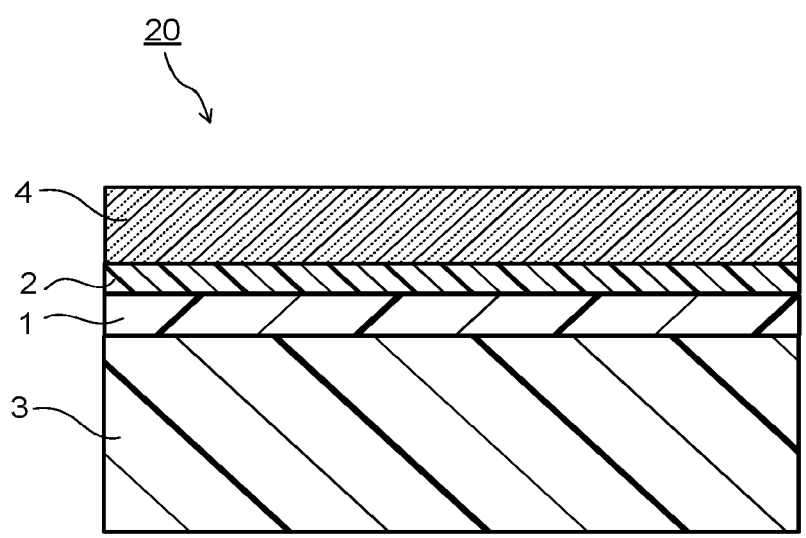
FIG. 1 is a cross-sectional view of one example of the resin substrate with a hard coating film obtained by the manufacturing method of the present invention.

Hereinafter, embodiments of the present invention will be described. Note that the present invention should not be construed as limited to the following description. A manufacturing method of the present invention is a method for manufacturing a resin substrate with a hard coating film having a resin substrate formed by injection molding, a resin film on one main surface of the resin substrate and a hard coating film including at least a primer layer and a hard coating layer laminated on the resin film at the opposite side of the resin substrate, and the method including the following steps of (1) to (3).

A step (1) of preparing the resin film with a thickness of 150 to 400 µm and made of a same kind of resin as a resin constituting the resin substrate, applying a primer layer forming composition containing a primer resin component containing an acrylic polymer (A) having a mass average molecular weight of 200,000 to 1,000,000 as a main component and a solvent by a wet method on one main surface of the resin film and drying the primer layer forming composition to form the primer layer having a content of the solvent of less than 1.5 mass % relative to 100 mass % of a total solid content, to obtain a resin film laminate (hereinafter, referred to as a primer layer forming step or step (1) as necessary)

A step (2) of forming the resin substrate by injection molding on another main surface of the resin film in the resin film laminate, to obtain a resin substrate with a resin film laminate (hereinafter, referred to as an injection molding step or step (2) as necessary)

A step (3) of applying a hard coating layer forming composition containing an organopolysiloxane (S) as a main component on the primer layer in the resin substrate with a resin film laminate and curing the hard coating layer forming composition, to obtain the resin substrate with a hard coating film (hereinafter, referred to as a hard coating layer forming step or step (3) as necessary)

According to the manufacturing method of the present invention, in manufacture of a resin substrate with a hard coating film in which the hard coating film is composed of a coating film obtained by sequentially applying and drying a primer layer forming composition and a hard coating layer forming composition, for example, a method can be employed which applies a primer layer forming composition on a long resin film and dries it to continuously form a primer layer to thereby obtain a resin film laminate, and then makes it into a desired size in the step (1), injection-molds a resin substrate on the resin film of the resin film laminate in the step (2), and finally applies a hard coating layer forming composition on the primer layer and cures it to form a hard coating layer in the step (3). As described above, the manufacturing method of the present invention can continuously form the primer layer in manufacture of the resin substrate with a hard coating film, and thus can be a method with productivity much better than a batch type method for forming each layer included in a hard coating film by performing coating and drying and so on for each resin substrate.

Further, the resin substrate with a hard coating film of the present invention thus obtained is a resin substrate with a hard coating film excellent in adhesiveness, abrasion resistance, and weather resistance and high in productivity.

Hereinafter, the manufacturing method of the present invention will be described referring to the drawings. FIG. 1 is a cross-sectional view of one example of the resin substrate with a hard coating film obtained by the manufacturing method of the present invention. A resin substrate with a hard coating film 20 illustrated in FIG. 1 is configured to have, on one main surface of a resin substrate 3, a resin film 1 made of the same kind of resin as the resin of the resin substrate, a primer layer 2, and a hard coating layer 4 in order from the resin substrate 3 side.

Figure 2A:
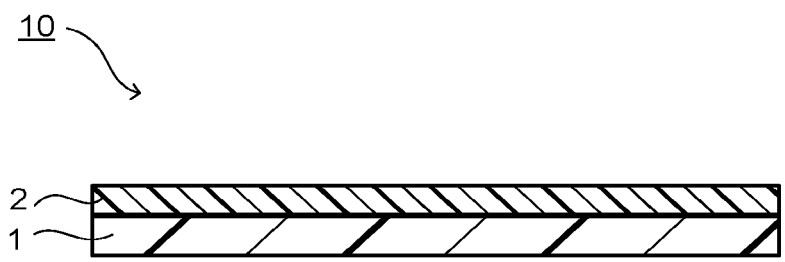
FIG. 2A is a cross-sectional view of one example of the resin film laminate in the manufacturing method of the present invention.
Figure 2B:
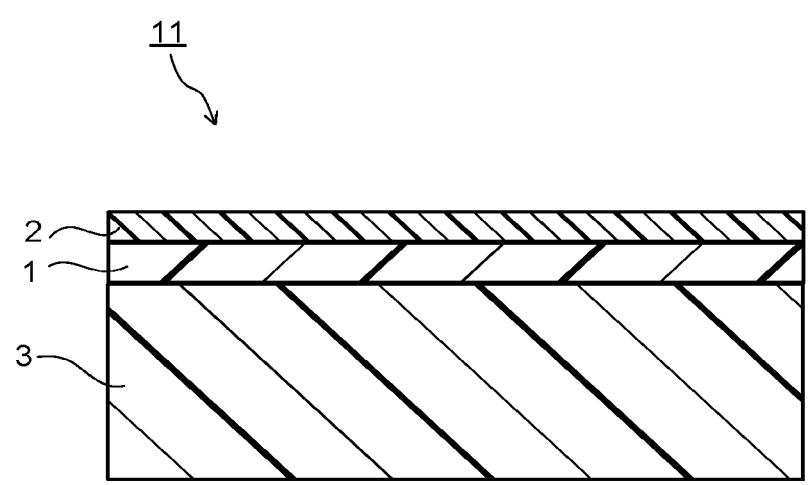
FIG. 2B is a cross-sectional view of one example of the resin substrate with a resin film laminate in the manufacturing method of the present invention.

In a manufacturing process of the resin substrate with a hard coating film 20, a resin film laminate 10 obtained after completion of the step (1) is illustrated in FIG. 2A, and a resin substrate with a resin film laminate 11 obtained after completion of the step (2) is illustrated in FIG. 2B. The resin film laminate 10 is configured to have the primer layer 2 on one main surface of the resin film 1. The resin substrate with a resin film laminate 11 is configured to have the resin film 1 and the primer layer 2 in this order on one main surface of the resin substrate 3.

In the manufacturing method of the present invention, by the step (3), the hard coating layer forming composition is applied on the primer layer 2 of the resin substrate with a resin film laminate 11 and cured to form a hard coating film composed of the primer layer 2 and the hard coating layer 4, whereby the resin substrate with a hard coating film 20 having the configuration illustrated in FIG. 1 is obtained.

Hereinafter, the steps of the manufacturing method of the present invention will be described together with materials for forming the resin film 1, the primer layer 2, the hard coating layer 4, and the resin substrate 3, referring to FIG. 2A and FIG. 2B taking the resin substrate with a hard coating film 20 illustrated in FIG. 1 as an example.

The Step (1): The Primer Layer Forming Step

In the manufacturing method of the present invention, in the step (1), the resin film 1 with a thickness of 150 to 400 µm is prepared, and the primer layer forming composition containing the primer resin component containing an acrylic polymer (A) having a mass average molecular weight of 200,000 to 1,000,000 as a main component and the solvent is applied by a wet method on one main surface of the resin film 1 and dried to form the primer layer 2 having a content of the solvent of less than 1.5 mass % relative to 100 mass % of the total solid content.

Setting the thickness of the resin film 1 to the above-described range makes it possible to suppress occurrence of external appearance defect resulting from wrinkling on the resin film 1 in injection molding of the step (2). Further, by setting the thickness of the resin film 1 to the above-described range, cooling of the molten resin to be injection-molded is sufficiently performed, thereby making it possible to suppress cloudiness of the resin film 1 caused from the heat of the molten resin. Further, the workability is also excellent. The thickness of the resin film 1 is preferably 180 to 350 µm, and more preferably 200 to 300 µm.

Further, in the step (1), the content of the solvent relative to 100 mass % of the total solid content in the primer layer 2 to be obtained is less than 1.5 mass %. Forming such a primer layer 2 by the wet method using the above-described primer layer forming composition makes it possible to suppress occurrence of surface roughness of the primer layer 2 caused by elution of the solvent in the resin substrate with a resin film laminate 11 obtained in the step (2). The content of the solvent relative to 100 mass % of the total solid content in the primer layer 2 is preferably less than 1.0 mass %.

The resin film 1 used in the step (1) is made of the same kind of resin as the resin constituting the resin substrate 3 and is more preferably the same resin. Accordingly, the material of the resin film 1 is defined by the constituent material of the resin substrate 3. The constituent material of the resin substrate 3 will be described below first.

The resin substrate 3 is formed by injection molding in the next step (2). The resin constituting the resin substrate 3 is not particularly limited as long as it is a transparent resin which can be injection-molded. Concrete examples thereof include a polycarbonate resin, a polystyrene resin, an aromatic polyester resin, an acrylic resin, a polyester resin, a polyarylate resin, a polycondensate of halogenated bisphenol A and ethylene glycol, an acrylic urethane resin, a halogenated aryl group-containing acrylic resin, and the like. Among them, the polycarbonate resin and the acrylic resin are preferable, and the polycarbonate resin is more preferable.

Examples of the polycarbonate resin include an aromatic polycarbonate, an aliphatic polycarbonate, an aromatic-aliphatic polycarbonate and the like. Among them, the aromatic polycarbonate (hereinafter, abbreviated as polycarbonate) is preferable. As the polycarbonate, a thermoplastic polycarbonate polymer or copolymer that is obtained by causing an aromatic dihydroxy compound or this compound and a small amount of polyhydroxy compound to react with phosgene or diester of carbonic acid and may be branched, can be exemplified. The method for manufacturing the polycarbonate is not particularly limited, and the polycarbonate can be manufactured by a phosgene method (interfacial polymerization method), a melting method (transesterification method) or the like which is conventionally known. The polycarbonate manufactured by the melting method may be adjusted in amount of OH groups as a terminal group.

Examples of the aromatic dihydroxy compound being the raw material of the polycarbonate include 2,2-bis(4-hydroxyphenyl)propane(=bisphenol A), tetramethylbisphenol A, bis(4-hydroxyphenyl)-1,4-diisopropylbenzene, hydroquinone, resorcinol, 4,4-dihydroxydiphenyl and the like.

The preferable one among them is bisphenol A. For the purpose of further enhancing the flame retardancy of the polycarbonate to be obtained, small amounts of a compound made by bonding one or more tetraalkylphosphonium sulfonate to the aromatic dihydroxy compound and/or a polymer or oligomer having a siloxane structure and containing phenolic OH groups at both terminals can be made to coexist.

To obtain the branched polycarbonate, it is only necessary to use a polyhydroxyl compound such as phloroglucin, 4,6-dimethyl-2,4,6-tri(4-hydroxyphenyl)heptene-2, 4,6-dimethyl-2,4,6-tri(4-hydroxyphenyl)heptane, 2,6-dimethyl-2,4,6-tri(4-hydroxyphenyl)heptene-3, 1,3,5-tri(4-hydroxyphenyl)benzene, 1,1,1-tri(4-hydroxyphenyl)ethane; or 3,3-bis (4-hydroxyaryl)oxyindole(=isatin bisphenol), 5-chloroisatin, 5,7-dichloroisatin, 5-bromoisatin or the like, substituted for a part of the aromatic dihydroxy compound. The amount of these compounds substituted for the aromatic dihydroxy compound is preferably in a range of 0.01 to 10 mol %, and particularly preferably 0.1 to 2 mol %.

Preferable examples of the polycarbonate include a polycarbonate derived from 2,2-bis(4-hydroxyphenyl)propane or a polycarbonate copolymer derived from 2,2-bis(4-hydroxyphenyl)propane and another aromatic dihydroxy compound. Further, for the purpose of further enhancing the flame retardancy of the polycarbonate to be obtained, a polymer or oligomer having a siloxane structure can be made to copolymerize. The polycarbonate may be a mixture of two or more kinds of resins having different compositions.

The haze of the polycarbonate is preferably 10% or less, more preferably 8% or less, and most preferably 5% or less in measurement of a molded product having a thickness of 1 mm, for example, as a haze measured in conformity to JIS K7105 (6.4). When the haze is more than 10%, the transparency of the resin substrate with a hard coating film to be obtained is likely to be insufficient.

The resin substrate 3 may contain an organic ultraviolet absorbent such as a benzotriazole-based compound, a benzophenone-based compound, a benzoate-based compound, a salicylate-based compound, a triaryl triazine-based compound or the like, or an inorganic ultraviolet absorbent such as a titanium oxide, a zinc oxide, a cerium oxide or the like, and may contain other light stabilizer, antioxidant, heat stabilizer, antistatic agent, heat ray reflection agent, heat ray absorption agent, flame retardant, lubricant, pigment, filler and the like, to an extent not impairing the transparency.

The resin film 1 used in the step (1) is made of the same kind of resin as the resin constituting the resin substrate 3. As with the resin substrate 3, polycarbonate is preferable for the resin film 1. As the polycarbonate used for the resin film 1, the same polycarbonates as described above can be exemplified.

Further, when the resin film 1 contains the ultraviolet absorbent, the content of the ultraviolet absorbent is preferably less than 0.5 mass % relative to 100 mass % of the resin constituting the resin film though depending on the ultraviolet absorbing ability of the ultraviolet absorbent used and the thickness of the resin film 1.

The size of the resin film 1 used in the step (1) is not particularly limited as long as it is larger than that of the resin substrate with a hard coating film to be finally obtained. From the viewpoint of improving the production efficiency, a long roll product is preferable.

In the step (1), for forming the primer layer 2 on the resin film 1, the primer layer forming composition is used. The primer layer forming composition contains, as a main body of the solid content, the primer resin component containing the acrylic polymer (A) having a mass average molecular weight (hereinafter, appropriately indicated by as "Mw") of 200,000 to 1,000,000 as a main component and contains the solvent.

The primer layer 2 is a layer provided for improving adhesiveness between the resin substrate 3 and the hard coating layer 4. The primer layer 2 of the resin substrate with a hard coating film 20 obtained by the manufacturing method of the present invention is a layer that is in direct contact with the resin film 1 that is adhered with the resin substrate 3 in injection molding of the resin substrate 3. The primer layer 2 containing, as a main body, the primer resin component containing the acrylic polymer (A) as a main component is laminated having sufficient adhesiveness with the resin substrate 3 via the resin film 1. Further, the primer layer 2 is also excellent in adhesiveness with the hard coating layer 4 to be formed thereon. Accordingly, the resin substrate with a hard coating film 20 to be obtained is a laminate in which any layers have sufficient adhesiveness therebetween.

The primer resin component mainly constituting the primer layer 2 contains the acrylic polymer (A) as a main component. The proportion of the acrylic polymer (A) in the primer resin component is preferably 80 to 100 mass %, more preferably 90 to 100 mass %, and particularly preferably 100 mass %.

The acrylic polymer (A), which has an Mw falling in the above-describe range, can sufficiently provide the adhesiveness as the primer layer 2 and exhibit stable physical properties even when it is exposed to light and heat. Further, when the ultraviolet absorbent is contained in the primer layer forming composition as described later, the ultraviolet absorbent can be increased in content and thereby contribute to improvement of weather resistance. The Mw of the acrylic polymer (A) is preferably 200,000 to 700,000, and more preferably 300,000 to 500,000. Further, a number average molecular weight (hereinafter, appropriately indicated by "Mn") of the acrylic polymer (A) is preferably 50,000 to 300,000, and more preferably 100,000 to 200,000. Furthermore, the degree of dispersion (Mw/Mn) is preferably 2.0 to 8.0, and more preferably 2.5 to 4.0. Note that the Mw and Mn in this description mean values obtained by measurement using polystyrene as a reference material by the gel permeation chromatography method.

In the next step (2), when the resin substrate 3 is injection-molded, the injection molding is performed in a manner that the resin substrate 3 is in contact with the resin film 1. The primer layer 2 needs to withstand the temperature in the injection molding. Note that in this description, the temperature in the injection molding means the temperature of the resin constituting the resin substrate 3 in the injection molding, namely, a molten resin temperature in the injection molding of the resin supplied for the injection molding. Hereinafter, the temperature in the injection molding is represented as "Tx" as necessary.

When a glass transition point (Tg) of the primer resin mainly constituting the primer layer and Tg of the acrylic polymer (A) that are its main component is generally higher than a temperature that is lower by 240° C. than the temperature (Tx) in the injection molding, namely, Tg>Tx−240° C., the primer layer 2 can sufficiently withstand the temperature in the injection molding in the step (2). When the Mw of the acrylic polymer (A) being the main component of the primer resin mainly constituting the primer layer 2 is in the above-described range, the Tg satisfies the above-described condition, so that the primer layer 2 can also sufficiently cope with the temperature in the injection molding. Note that the upper limit of the Tg of the acrylic polymer (A) is not particularly limited, but is preferably about 150° C.

As described above, the resin of the resin substrate 3 is preferably polycarbonate, and in this case, the Tg of the acrylic polymer (A) is preferably higher than 60° C. and 150° C. or lower. When the Tg is 60° C. or lower, the primer layer 2 is difficult to sufficiently withstand the temperature in the injection molding in the step (2), and a coating film to be obtained is likely to become rough surface or the like. When the Tg exceed 150° C., the smoothness of the coating film to be obtained is likely to become insufficient. In any case, the external appearance is likely to become undesirable. Note that the Tg of the acrylic polymer (A) is more preferably 70 to 120° C., and particularly preferably 90 to 110° C.

As the acrylic polymer (A), an acrylic polymer satisfying the above Mw, among acrylic polymers used for the primer layer 2 for bringing the resin substrate 3 and the hard coating layer 4 into close contact, is generally used without any particular limitation. Further, as the acrylic polymer (A), an acrylic polymer satisfying the above Mw and having a Tg falling within the above range is preferable. Furthermore, an acrylic polymer (A) having a polymerization unit based on a monomer having a methacrylic group is preferably used. Regarding the monomer being the polymerization unit of the acrylic polymer (A), an acrylic ester, an acrylic acid and the like can be exemplified as a monomer having an acrylic group, and a methacrylic acid ester, a methacrylic acid and the like can be exemplified as a monomer having a methacrylic group. Hereinafter, the monomer having a methacrylic group and the monomer having an acrylic group are collectively referred to also as an "acrylic monomer".

Note that in this description, the representation of "(meth) acryl . . . " such as a (meth)acrylic acid ester means both of "acryl . . . " and "methacryl . . . ".

Examples of the (meth)acrylic acid ester include a (meth) acrylic acid alkyl ester, a (meth)acrylic acid ester with a hydrogen atom of an alkyl group substituted by a functional group such as a hydroxy group, and the like. The acrylic polymer (A) is preferably a polymer having only an acrylic monomer as a polymerization unit. In the case of using a monomer other than the acrylic monomer as necessary, the monomer other than the acrylic monomer is less than 10 mol % relative to all raw material monomers. The acrylic polymer (A) is preferably a polymer containing the monomer having a methacrylic group as a "main monomer" (specifically, 90 to 100 mol % relative to all raw material monomers, the same applying hereafter).

The monomer having a methacrylic group is preferably a methacrylic acid alkyl ester having an alkyl group with 6 or less carbon atoms. In other words, as the acrylic polymer (A), a homopolymer having, as a main monomer, at least one kind selected from a group consisting of methacrylic acid alkyl esters having an alkyl group with 6 or less carbon atoms, or a copolymer of the monomers. As the homopolymer, a polymethyl methacrylate can be exemplified.

Further, the acrylic polymer (A) is preferably a copolymer composed of a main monomer selected from a group consisting of methacrylic acid alkyl esters having an alkyl group with 6 or less carbon atoms, and at least one kind of other (meth)acrylic acid esters and/or (meth)acrylic acids. Examples of the other (meth)acrylic acid esters include a methacrylic acid ester having an alkyl group with 7 or more carbon atoms or having a cycloalkyl group with 12 or less carbon atoms, an acrylic acid alkyl ester, and a (meth)acrylic acid ester made by substituting a functional group such as a hydroxy group for a hydrogen atom of an alkyl group in a (meth)acrylic acid alkyl ester, and the like. Examples of the above-described cycloalkyl group include a cyclohexyl group, a 4-methylcyclohexyl group, a 4-t-butylcyclohexyl group, an isobornyl group, a dicyclopentanyl group, a dicyclopentenyloxyethyl group and the like.

The acid value of the acrylic polymer (A) is preferably 1 mgKOH/g or less. When the acid value exceeds 1 mgKOH/g, cracks and the like become likely to occur in a coating film to be obtained, resulting in an undesirable external appearance. The acid value of the acrylic polymer (A) is more preferably 0.8 mgKOH/g or less, and particularly preferably 0 mgKOH/g. Here, the acid value means the number of milligrams of a potassium hydroxide required for neutralizing a resin acid in 1 g of a sample, and is a value measured in conformity to the measuring method of JIS K 0070.

The acrylic polymer (A) can be manufactured using the above-described raw material acrylic monomer, preferably, a methacrylic acid alkyl ester having an alkyl group with 6 or less carbon atoms as the raw material monomer together with, as necessary, other acrylic monomers in an amount of 10 mol % or less relative to the total amount of the raw material monomers, a molecular weight regulator, a polymerization initiator, a suspension stabilizer, an emulsifier and the like, by an ordinary method of polymerizing an acrylic monomer, for example, a polymerization method such as a solution polymerization method, a bulk polymerization method, a suspension polymerization method, and an emulsion polymerization method.

Note that acrylic polymers having the above-described excellent characteristics are commercially available as the acrylic polymer (A), and such commercial products can be used in the present invention. Examples of the commercial product include Dianal BR88 (trade name, manufactured by Mitsuibishi Rayon Co., Ltd., polymethylmethacrylate (PMMA), Tg; 105° C., Mw; 430,000), M-4003 (trade name, manufactured by Negami Chemical Industrial Co., Ltd., polymethylmethacrylate (PMMA), Tg; 105° C., Mw; 810, 000), and the like. The acrylic polymer (A) may be composed of only one kind of such acrylic polymers, or two or more kinds of them may be used in mixture.

The primer layer 2 may contain a resin component other than the acrylic polymer (A) as a primer resin component mainly constituting the primer layer 2. Examples of the resin component include a vinyl-based polymer, a urethane resin, a polyester resin, a polyether resin, an epoxy resin, a melamine resin and the like. These resin components are concretely used to be compounded in the primer layer forming composition. Hereinafter, also the components arbitrarily contained in the primer layer are similarly compounded in the primer layer forming composition, and thereby contained in a primer layer to be obtained.

The primer layer 2 preferably contains an ultraviolet absorbent. Thus, the primer layer 2 absorbs ultraviolet to retain the ultraviolet from reaching the resin substrate 3 and the resin film 1, and thereby can suppress yellowing of the resin substrate 3 and the resin film 1. As the ultraviolet absorbent, an ultraviolet absorbent high in absorption performance in a region of a relatively long wavelength in the ultraviolet, for example, a region of 350 to 380 nm is preferable.

The ultraviolet absorbent contained in the primer layer is preferably an ultraviolet absorbent having the above-described absorption characteristics and being non-polymerizable. As the non-polymerizable ultraviolet absorbent, a benzophenone-based ultraviolet absorbent, a benzotriazole-based ultraviolet absorbent, a benzimidazole-based ultraviolet absorbent, a cyanoacrylate-based ultraviolet absorbent, a salicylate-based ultraviolet absorbent, a benzylidene malonate-based ultraviolet absorbent, a triazine-based ultraviolet absorbent, or the like can be concretely used. Among them, at least one kind selected from a group consisting of the benzophenone-based ultraviolet absorbent, the triazine-based ultraviolet absorbent, and the benzotriazole-based ultraviolet absorbent is preferable. The ultraviolet absorbent contained in the primer layer may be one kind of them, or two or more kinds of them may be used in combination.

The content of the ultraviolet absorbent in the primer layer 2 is preferably 5 to 50 mass %, more preferably 10 to 40 mass %, and particularly preferably 20 to 35 mass % relative to 100 mass % of the primer resin component mainly constituting the primer layer 2. By setting the content of the ultraviolet absorbent in the primer layer 2 to the above-described range, it is possible to make the adhesiveness of the hard coating film sufficient and sufficiently impart the weather resistance to the resin substrate.

The primer layer 2 in the present invention is preferably a layer containing the acrylic polymer (A) satisfying the above Mw and having an acid value of 1 mgKOH/g or less and a Tg of higher than 60° C. and 150° C. or lower, and the ultraviolet absorbent.

The primer layer 2 may further contain a light stabilizer and so on. Examples of the light stabilizer include: hindered amines; and nickel complexes such as a nickelbis(octylphenyl)sulfide, a nickel complex-3,5-di-t-butyl-4-hydroxybenzyl phosphate monoethylate, and a nickel dibutyldithiocarbamate. One kind of them may be used, or two or more kinds of them may be used in combination. The content of the light stabilizer in the primer layer 2 is preferably 0.01 to 50 mass % and particularly preferably 0.1 to 10 mass % relative to 100 mass % of the primer resin component mainly constituting the primer layer 2.

In the step (1), on one main surface of the above-described resin film 1, the primer layer forming composition containing the components contained in the above-described primer layer 2, namely, a primer resin component containing the acrylic polymer (A) as a main component and arbitrary components such as the ultraviolet absorbent, and additionally a solvent, is applied by a wet method and dried to form the primer layer 2.

The solvent contained in the primer layer forming composition is not particularly limited as long as it can stably dissolve the primer resin component containing the acrylic polymer (A) as a main component. Concrete examples of the solvent include: ketones such as acetone, methylethylketone, methylisobutylketone, and cyclohexanone; ethers such as tetrahydrofuran, 1,4-dioxane, and 1,2-dimethoxyethane; esters such as ethyl acetate, butyl acetate, and methoxyethyl acetate; alcohols such as methanol, ethanol, 1-propanol, 2-propanol, 1-butanol, 2-butanol, 2-methyl-1-propanol, 2-methoxyethanol, diacetone alcohol, 2-butoxyethanol, and 1-methoxy-2-propanol; hydrocarbons such as n-hexane, n-heptane, isooctane, benzene, toluene, xylene, gasoline, light oil, and kerosene; and acetonitrile, nitromethane, water, and the like. One kind of them may be used, or two or more kinds of them may be used in combination.

The amount of the solvent is preferably 50 to 10,000 mass % and particularly preferably 100 to 10,000 mass % relative to 100 mass % of the primer resin component containing the acrylic polymer (A) as a main component. Note that the content of the solid content in the primer layer forming composition is preferably 0.5 to 75 mass %, and particularly preferably 1 to 60 mass % relative to the total amount of the composition.

The primer layer forming composition may further contain additives such as a leveling agent, a defoaming agent, a viscosity modifier.

As the method of applying the primer layer forming composition on the resin film 1, an ordinary coating method by a wet method is applicable without any particular limitation. Concrete examples of the method include a spray coating method, a dip coating method, a flow coating method, a die coating method, a spin coating method and the like. By drying the obtained applied film, the primer layer 2 is obtained.

The formation of the primer layer 2 in the step (1) is performed so that the content of the solvent in the primer layer 2 to be obtained becomes less than 1.5 mass % relative to 100 mass % of the total solid content in the primer layer 2. The content of the solvent in the primer layer 2 is more preferably less than 1.0 mass % relative to 100 mass % of total solid content in the primer layer 2.

Accordingly, in the present invention, a condition that the content of the solvent in the primer layer 2 to be obtained falls within the above-described range is appropriately selected as a drying condition of the applied film. The drying condition greatly depends on the boiling point of the solvent contained in the primer layer forming composition and the performance of a drying device. For example, in the case where a high-boiling point solvent such as diacetone alcohol (boiling point: 166° C.) is contained in the primer layer forming composition, the drying condition that the content of the solvent falls within the above-described range is preferably drying at 80 to 130° C. for 15 minutes to 2 hours, and more preferably at 120 to 130° C. for 15 minutes to 1 hour. Note that the drying can be performed intermittently with the temperature and method changed, or continuously. The method of drying is not particularly limited. Examples of the method of drying include drying using a hot plate, a convection type drier, a thermostatic oven, an infrared heating device and the like.

Note that the amount of the solvent contained in the primer layer can be found, for example, by manufacturing the primer layer separately on the same resin film under the same condition as the condition under which it is to be manufactured, peeling the primer layer from the resin film, dissolving the primer layer in a good solvent for the component constituting the primer layer, such as deuterochloroform, and subjecting the obtained solution to an analyzer for nuclear magnetic resonance analysis ($^1$H-NMR).

In the present invention, the primer layer 2 is obtained by being applied by the wet method and dried as described above, whereby a primer layer 2 capable of sufficiently functioning even with a small film thickness as described below can be formed. Further, the primer layer 2 by the manufacturing method of the present invention can be increased in content of the ultraviolet absorbent as described above, so that a primer layer 2 having high weather resistance even with a small film thickness can be formed.

The film thickness of the primer layer 2 to be obtained, namely, the film thickness of the primer layer 2 before the following step (2) is performed, is not particularly limited as long as it satisfies the requirements required as the primer layer 2 in the resin substrate with a hard coating film 20 to be finally obtained, and is appropriately adjusted in consideration of the film thickness of the hard coating layer 4 to be formed on the primer layer 2.

If the film thickness of the primer layer 2 is too small in the resin substrate with a hard coating film 20 to be finally obtained, there is a concern about a reduction in weather-crack resistance, weather resistant adhesiveness, and colorability after weather resistance test of the resin substrate with a hard coating film 20. Note that the film thickness of the primer layer 2 in the resin substrate with a hard coating film 20 to be finally obtained may become smaller than the film thickness before the step (2) and the step (3) because of the injection molding of the resin substrate 3 by the step (2) and the formation of the hard coating layer 4 by applying the hard coating layer forming composition onto the primer layer 2 and curing it by the step (3), and therefore the film thickness of the primer layer 2 before the step (2) and the step (3) is preferably set to be a film thickness necessary and enough for the resin substrate 3 and the resin film 1 to come into sufficient close contact and adhere with the hard coating layer 4 via the primer layer 2 in the resin substrate with a hard coating film 20 to be finally obtained.

As described above, concretely, the film thickness of the primer layer 2 before the injection molding of the resin substrate 3 and the formation of the hard coating layer 4, namely, after the finish of the step (1) is preferably 0.1 µm to 10 µm, and particularly preferably 1 µm to 7 µm.

Further, until before the resin substrate 3 is injection-molded on the resin film 1, functional layers (a decorative printing layer, an antenna layer, an infrared cut layer and so on) may be formed on a surface different from the surface on which the primer layer 2 is formed. This makes it possible to easily impart various functions to the resin substrate with a hard coating film 20.

In the above manner, the resin film laminate 10 having the primer layer 2 formed on one main surface of the resin film 1 having the cross section illustrated in FIG. 2A can be obtained. Note that in the case of continuously forming the primer layer 2 on the long resin film 1 into the resin film laminate 10, before the following step (2), the resin film laminate 10 is cut by an ordinary method according to the size of the surface of the injection-molded resin substrate 3 to which the resin film laminate 10 is to be brought into close contact.

The Step (2): The Injection Molding Step

Subsequently, by the step (2), the resin substrate 3 is formed by injection molding on the other main surface of the resin film 1 in the resin film laminate 10 obtained in the above step (1), to obtain the resin substrate with a resin film laminate 11 as illustrate in FIG. 2B. The resin substrate 3 to be injection-molded is as described in the above step (1). The resin is preferably polycarbonate but not limited to this.

Figure 3A:
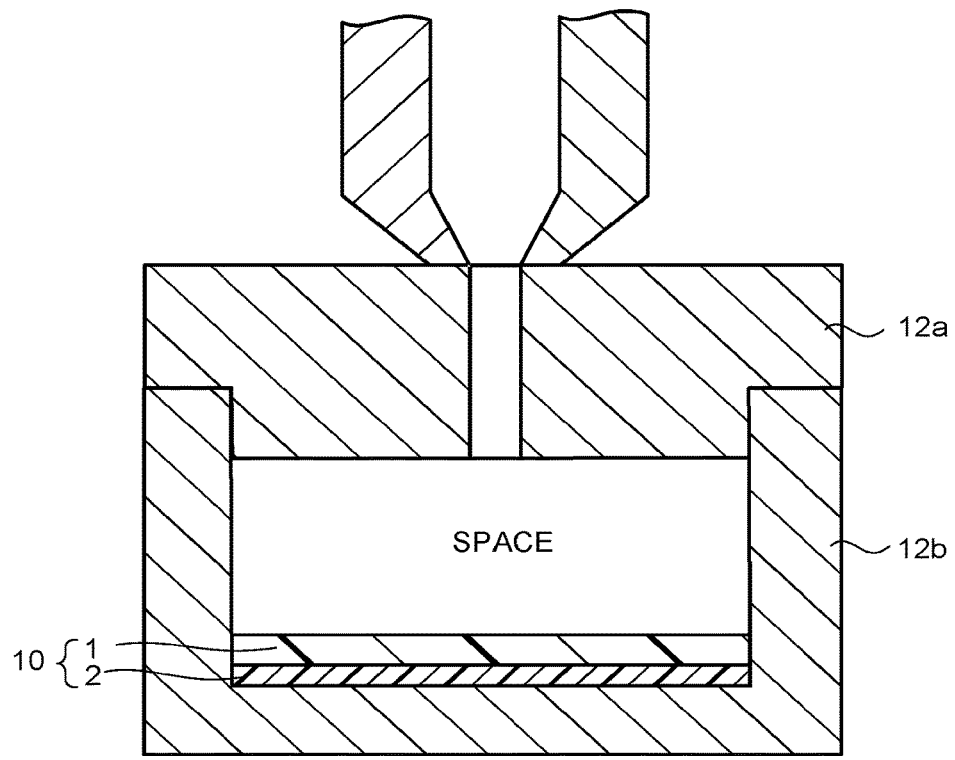
FIG. 3A is a cross-sectional view of one example when injection molding the resin substrate in the manufacturing method of the present invention.
Figure 3B:
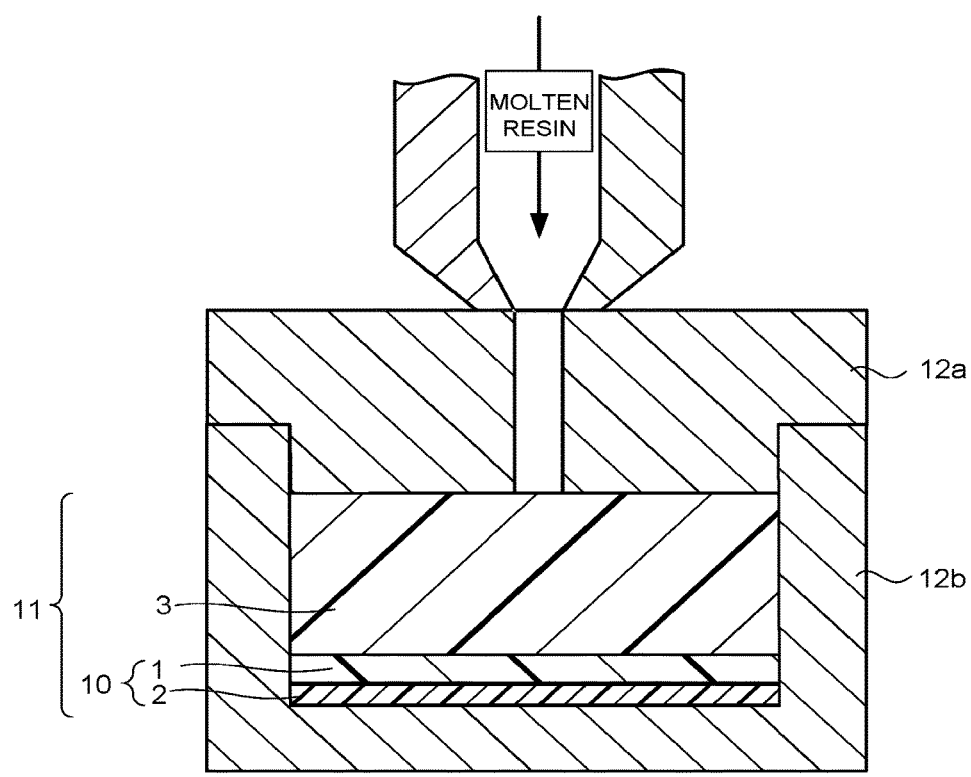
FIG. 3B is a cross-sectional view of one example when injection molding the resin substrate in the manufacturing method of the present invention.

The method of the injection molding is not particularly limited, and generally, the same method as that of injection molding a resin using a mold is applicable. FIG. 3A and FIG. 3B illustrate cross-sectional views of an example when injection molding the resin substrate in the manufacturing method of the present invention. FIG. 3A and FIG. 3B illustrate a method for obtaining the resin substrate with a resin film laminate using an apparatus which is provided with an upper mold 12a and a lower mold 12b and capable of molding the resin substrate by injecting a molten resin into a space formed by the two molds 12a, 12b. The step (2) will be concretely described using the method illustrated in FIG. 3A and FIG. 3B as an example.

In the step (2), as illustrated in FIG. 3A, the resin film laminate 10 obtained in the above step (1) is placed in the lower mold 12b such that the primer layer 2 of the resin film laminate 10 is in contact with the bottom surface of the lower mold 12b. Thereafter, as illustrated in FIG. 3B, the upper mold 12a is placed on the lower mold 12b, the molten resin is injected into the space formed by the two molds 12a, 12b from a resin inlet of the upper mold 12a to fill the space with the molten resin to thereby mold the resin substrate 3 to be in contact with the resin film 1 of the resin film laminate 10. Thereby, the resin substrate with a resin film laminate 11 high in adhesiveness between the resin film 1 and the resin substrate 3 is obtained.

Note that when filling with the molten resin, a slight gap may be provide between the lower mold 12b and the upper mold 12a, and the molds 12b, 12a may be completely closed without any gap left between them after filling with the molten resin.

To obtain the resin substrate with a resin film laminate 11 high in drawing ratio of a quadric surface or a tertiary curved surface as a product shape, it is preferable to shape in advance the resin film laminate 10 into the shape of the surface of the mold for placing the resin film laminate 10 thereon, and then placing the resin film laminate 10 in the mold. In the case of laminating and integrally molding the resin film laminate 10 and the resin substrate 3 formed by injection molding, for example, when the curvature (H/D) of the resin substrate with a resin film laminate 11 to be obtained exceeds 0.1, wrinkling may occur on the resin film laminate 10. In such a case, the resin film laminate 10 is preferably preformed in advance by vacuum forming, air pressure forming, press forming, straight forming, drape forming, plug-assist forming or the like, and by imparting a shape by the vacuum forming or the like, the resin substrate with a resin film laminate 11 excellent in shaping property is obtained.

The thickness of the resin substrate 3 formed by the injection molding only needs to be arbitrarily selected depending on applications. The thickness of the resin substrate 3 is preferably 1 mm to 30 mm, and more preferably 2 mm to 20 mm for the window material application.

Here, the temperature of the injection molding, namely, the temperature of the molten resin depends on the kind of the resin used. In the case of using polycarbonate as the resin, the temperature of the molten resin is set to almost 270 to 380° C. Further, in the injection molding, the two molds 12a, 12b are generally independently warmed by an electric heater or the like at a temperature that is lower by 200 to 300° C. than the temperature of the molten resin.

In the manufacturing method of the present invention, the primer layer 2 is formed, on the resin film 1, of the material selected as described above in order to withstand the temperature in the injection molding, so that the primer layer 2 in the resin substrate with a resin film laminate 11 to be obtained functions without any change as compare with that after the above-described step (1).

The Step (3): The Hard Coating Layer Forming Step

In the manufacturing method of the present invention, subsequently by the step (3), the hard coating layer forming composition containing an organopolysiloxane (S) as a main component is applied on the primer layer 2 in the resin substrate with a resin film laminate 11 obtained in the above-described step (2) and cured to form the hard coating layer 4. Thus, for example, the resin substrate with a hard coating film 20 whose cross section is illustrated in FIG. 1 is obtained.

As the organopolysiloxane (S) that the hard coating layer forming composition contains as a main component, any curable organopolysiloxane can be used without any particular limitation.

Generally, an organopolysiloxane is composed of silicon-containing bond units called an M unit, a D unit, a T unit, and a Q unit. The curable organopolysiloxane used for forming the hard coating layer 4 in the manufacturing method of the present invention is preferably an oligomer-like polymer mainly composed of the T unit or the Q unit among them.

In the curable organopolysiloxane, T units are classified into three kinds of units that are called T1, T2, and T3. T1 has a number of oxygen atoms bonded to other silicon atoms of 1, T2 has a number of the oxygen atoms of 2, and T3 has a number of the oxygen atoms of 3. In this description and the like, the oxygen atom bonded to another silicon atom is represented by O*, and a monovalent functional group which can be bonded to another silicon atom is represented by Z.

Note that O* representing the oxygen atom bonded to another silicon atom is an oxygen atom bonding two silicon atoms, and is an oxygen atom in the siloxane bonding represented by Si—O—Si. Accordingly, one O* exists between silicon atoms of two silicon-containing bond units. In other words, O* represents an oxygen atom shared between two silicon atoms of two silicon-containing bond units. In a later-described chemical formula of the silicon-containing bond unit, O* is expressed as bonding to one silicon atom, but this O* is an oxygen atom shared with the silicon atom of another silicon-containing bond unit, but does not mean that two silicon-containing bond units are bonded by a bonding represented by Si—O*—O*—Si.

The monomer is represented by $(R'—)_aSi(—Z)_{4-a}$. In the formula, "a" represents an integer of 0 to 3, R' represents a hydrogen atom or a monovalent organic group, and Z represents a hydroxyl group or a monovalent functional group which can be bonded to another silicon atom. In this chemical formula, a compound of a=3 is an M monomer, a compound of a=2 is a D monomer, a compound of a=1 is a T monomer, and a compound of a=0 is a Q monomer. In the monomer, a Z group is generally a hydrolyzable group. Further, in the case where two or three R' exist (in the case where a is 2 or 3), a plurality of R's may be different from each other. R' is preferably in the same category as that of a later-described preferable R.

In the case where the Z group of the monomer is a hydrolyzable group, examples of the Z group include an alkoxy group, a chlorine atom, an acyloxy group, an isocyanate group and the like. In many cases, as the monomer, a monomer with an alkoxy group as the Z group is used.

As the organopolysiloxane (S), a curable organopolysiloxane composed of the T unit as a main silicon-containing bond unit is preferable among the curable organopolysiloxanes. Hereinafter, the curable organopolysiloxane is referred to only as an organopolysiloxane unless otherwise stated. Further, in this description, an organopolysiloxane having the T unit as a main constitutional unit (herein after, referred to as an "organopolysiloxane (T)" as necessary) means an organopolysiloxane having a proportion of the number of T units of 50 to 100% relative to the total number of the M units, D units, T units, and Q units. As the organopolysiloxane (S), an organopolysiloxane (T) having the proportion of the number of T units of 70 to 100% is more preferable, and an organopolysiloxane (T) having the proportion of the number of T units of 90 to 100% is particularly preferable. Further, as the other units contained in a small amount other than the T unit, the D unit and the Q unit are preferable, and the Q unit is particularly preferable.

More specifically, as the organopolysiloxane (S), an organopolysiloxane (T) composed only of the T unit and the Q unit and having a ratio between their numbers of T:Q=90:10 to 100:0 is particularly preferable among the curable organopolysiloxanes. Note that the ratio among the numbers of the M units, D units, T units, and Q units in an organopolysiloxane can be calculated from a value of a peak area ratio by $^{29}$Si-NMR.

As the organopolysiloxane (S), an organopolysiloxane (T) having the T units represented by the following T1 to T3 is furthermore preferable.

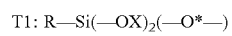

T1: R—Si(—OX)$_2$(—O*—)

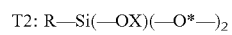

T2: R—Si(—OX)(—O*—)$_2$

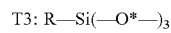

T3: R—Si(—O*—)$_3$

In the formulas, R represents an alkyl group having 1 to 6 carbon atoms, X represents a hydrogen atom or an alkyl group having 1 to 3 carbon atoms, and O* represents an oxygen atom linking two silicon atoms.

R in the above-described chemical formulas is not limited to one kind, and each of T1, T2, T3 may contain a plurality of kinds of Rs. Further, —OX in the above-described chemical formulas represents a hydroxyl group or an alkoxy group. —OX may be the same or different between T1 and T2. Two —OXs in T2 may be different and, for example, one of them may be a hydroxyl group and the other may be an alkoxy group. Further, when both the two —OXs are alkoxy groups, the alkoxy groups may be different alkoxy groups. However, as will be described later, the two alkoxy groups are generally the same alkoxy group.

Note that a T unit having no oxygen atom (O*) bonding two silicon atoms but having only three —OXs is referred to as T0 hereinafter. T0 actually corresponds to an unreacted T monomer contained in an organopolysiloxane and it is not a silicon-containing bond unit. The T0 is measured similarly to T1 to T3 in the analysis of the units of T1 to T3.

T0 to T3 in an organopolysiloxane can be analyzed by measuring the bonding state of the silicon atoms in the organopolysiloxane by nuclear magnetic resonance analysis ($^{29}$Si-NMR). A ratio among the numbers of T0 to T3 is obtained from a peak area ratio by $^{29}$Si-NMR. —OX in an organopolysiloxane molecule can be analyzed by infrared absorption spectrometry. The ratio between the numbers of the hydroxyl groups and alkoxy groups bonded to silicon atoms is obtained from a peak area ratio between infrared absorption peaks of them. The Mw, Mn, and degree of dispersion (Mw/Mn) of the organopolysiloxane refer to values obtained by measurement using polystyrene as a reference material by the gel permeation chromatography method. Such characteristics of the organopolysiloxane do not mean characteristics of one molecule, but are obtained as average characteristics of molecules.

In the organopolysiloxane (T), as each of the plurality of T1, T2, T3 existing in one molecule, two or more kinds may exist. For example, two or more kinds of T2 having different Rs may exist. Such an organopolysiloxane can be obtained from a mixture of two or more kinds of T monomers. For example, it is conceivable that in an organopolysiloxane obtained from the mixture of two or more kinds of T monomers having different Rs, two or more kinds of each of T1, T2, T3 having different Rs exist. The ratio among the numbers of different Rs of whole T units in the organopolysiloxane obtained from the mixture of a plurality of kinds of T monomers having different Rs reflects a composition ratio in the mixture between the T monomers having different Rs. However, the ratio between the numbers of the units having different Rs in each of T1, T2, T3 does not always reflect the composition ratio in the mixture between the T monomers having different Rs. This is because even if three —OXs in the T monomer are the same, the reactivities of the T monomer, T1 and T2 are sometimes different because Rs are different.

The organopolysiloxane (T) is preferably manufactured from at least one kind of a T monomer represented by R—Si(—OM)$_3$. In this formula, R is the same as the above-described R, and M represents an alkyl group having 1 to 3 carbon atoms. M may be a substituted alkyl group such as an alkoxy-substituted alkyl group other than an unsubstituted alkyl group. The three Ms in one molecule may be different. However, the three Ms are generally the same alkyl group. The M is preferably an alkyl group having 1 to 3 carbon atoms, and more preferably an alkyl group having 1 or 2 carbon atoms. Concrete examples of M include a methyl group, an ethyl group, an n-propyl group and the like.

R is an alkyl group having 1 to 6 carbon atoms. Concrete examples of R include a methyl group, an ethyl group, an n-propyl group, an n-butyl group, an i-butyl group, a t-butyl group, a hexyl group and the like. As R, an alkyl group having 1 to 4 carbon atoms is particularly preferable.

As the organopolysiloxane (T), an organopolysiloxane obtained by using only the T monomer having an alkyl group with 1 to 4 carbon atoms as R or two or more kinds thereof is preferable.

Concrete examples of the T monomer having an alkyl group with 1 to 6 carbon atoms as R include methyltrimethoxysilane, methyltriethoxysilane, methyltripropoxysilane, ethyltrimethoxysilane, ethyltriethoxysilane and the like. In particular, methyltrimethoxysilane or ethyltrimethoxysilane is preferable.

Examples of the T-monomer (a=3) represented by (R'—)$_a$Si(—Z)$_{4-a}$ other than the T monomer represented by R—Si(—OM)$_3$ include methyltrichlorosilane, ethyltrichlorosilane, methyltriacetoxysilane, ethyltriacetoxysilane and the like.

In the D monomer (a=2) represented by (R'—)$_a$Si(—Z)$_{4-a}$, two R's may be the same or different. In the case where they are the same, an alkyl group having 1 to 6 carbon atoms is preferable. In the case where they are different, one of the R's is preferably an alkyl group having 1 to 4 carbon atoms and the other R' is preferably a substituted organic group substituted by the above-described functional group, a functional group-containing organic group or the like. Further, as the Z group, an alkoxy group having 1 to 3 carbon atoms, an acetoxy group and the like are preferable.

Examples of the D monomer include dimethyldimethoxysilane, dimethyldiethoxysilane, vinylmethyldimethoxysilane, vinylmethyldiethoxysilane, phenylmethyldimethoxysilane, phenylmethyldiacetoxysilane, 3-chloropropylmethyldimethoxysilane, 3,3,3-trifluoropropylmethyldimethoxysilane, 3-mercaptopropylmethyldiethoxysilane, 3-acryloyloxypropylmethyldimethoxysilane, 3-methacryloyloxypropylmethyldimethoxysilane, 3-aminopropylmethyldimethoxysilane, 3-aminopropylmethyldiethoxysilane, N-(2-aminoethyl)-3-aminopropylmethyldimethoxysilane, and 3-cyanoethylmethyldimethoxysilane.

In the Q monomer (a=0) represented by (R'—)$_a$Si(—Z)$_{4-a}$, four Z groups may be different but are generally the same. The Z group is preferably an alkoxy group having 1 to 3 carbon atoms, and particularly preferably a methoxy group or an ethoxy group. Examples of the Q monomer include tetramethoxysilane, tetraethoxysilane, and tetra n-propoxy silane.

The organopolysiloxane (T) used in the present invention is obtained by subjecting the above-described T monomer or the like to partial hydrolysis and condensation. This reaction is generally carried out by heating the T monomer or the like and water in a solvent. A catalyst is preferably made to exist in a reaction system. By adjusting reaction conditions such as the kind of the monomer, the quantity of water, the heating temperature, the kind and quantity of the catalyst, and the reaction time, an intended organopolysiloxane can be manufactured. Further, depending on the circumstances, it is also possible to use a commercially available organopolysiloxane as it is as the intended organopolysiloxane or manufacture the intended organopolysiloxane by using a commercially available organopolysiloxane.

As the above-described catalyst, an acid catalyst is preferable. Examples of the acid catalyst include: inorganic acids such as a hydrochloric acid, a sulfuric acid, a nitric acid, a phosphoric acid, a nitrous acid, a perchloric acid, and a sulfamic acid; and organic acids such as a formic acid, an acetic acid, a propionic acid, a butyric acid, an oxalic acid, a succinic acid, a maleic acid, a lactic acid, and a p-toluenesulfonic acid. In particular, the acetic acid is preferable. As the above-described solvent, a hydrophilic organic solvent is preferable, and an alcohol-based solvent is particularly preferable. Examples of the alcohol-based solvent include methanol, ethanol, 1-propanol, 2-propanol, 1-butanol, 2-butanol, 2-methyl-1-propanol, 2-ethoxyethanol, diacetone alcohol, and 2-butoxyethanol. Regarding the reaction temperature, the reaction can be carried out at room temperature when the catalyst exists. Generally, an appropriate temperature is selected according to the object from the reaction temperature of 20 to 80° C.

As will be described later, among the organopolysiloxanes (T) used in the present invention, an organopolysiloxane (a) is an organopolysiloxane with a relatively high-molecular weight having a smaller abundance of T0 and T1 and a ratio in abundance between T2 and T3 falling within a certain range, and such an organopolysiloxane can be manufactured by selecting relatively mild reaction conditions.

The reactivity of the condensation reaction changes depending on R, so that when R is different, the reactivity of the hydroxyl group also changes. Generally, as R is smaller (for example, in the case where R is an alkyl group, as the number of carbon atoms of the alkyl group is smaller), the reactivity of the hydroxyl group is higher. Accordingly, it is preferable to select the T monomer in consideration of the relationship between the reactivity of the hydrolyzable group and the reactivity of the hydroxyl group.

The organopolysiloxane (S) may be composed of only one kind of the curable organopolysiloxanes (T) thus obtained or composed of two or more kinds of them. A combination of the organopolysiloxanes (T) that is particularly preferable from the viewpoint of abrasion resistance and weather resistance is a combination of the organopolysiloxane (a) and an organopolysiloxane (b) which will be described below. However, the curable organopolysiloxane used as the organopolysiloxane (S) in the present invention is not limited to them. Further, the organopolysiloxane (a) and the organopolysiloxane (b) are not precluded from being used independently as the organopolysiloxane (S) in the present invention.

(Organopolysiloxane (a))

The organopolysiloxane (a) used in the present invention contains units of T1 to T3 at a ratio of T1:T2:T3=0 to 5:30 to 45:50 to 70 and T3/T2≥1.5. Further, in the organopolysiloxane (a), a ratio between the number of OX groups which are hydroxyl groups (Hy) and the number of OX groups which are alkoxy groups (Al), (Hy)/(Al) is 12.0 to 100 on a molecular average. Further, the Mw of the organopolysiloxane (a) is 800 to 8,000. Note that the organopolysiloxane (a) contains substantially no T0 being the T monomer.

Regarding the ratio among T1, T2, and T3 constituting the organopolysiloxane (a), (T2+T3)/(T1+T2+T3) preferably falls within a range of 0.85 to 1.00, and more preferably 0.90 or more and less than 1.00, in addition to the above-described conditions. Further, a preferable range of T3/T2 is 1.5 to 2.0.

Setting the ratio among T1, T2, and T3 constituting the organopolysiloxane (a) to such a range in an average composition of each molecule makes it possible to improve the abrasion resistance and the weather resistance of the hard coating layer 4 to be obtained when using the organopolysiloxane (a) and the later-described organopolysiloxane (b) in combination for the above-described hard coating layer forming composition.

The (Hy)/(Al) in the organopolysiloxane (a) is a parameter indicating the condensation reactivity. With a large value of the parameter, namely, with a larger ratio of the hydroxyl groups as compared with the alkoxy groups, the curing reaction when forming the hard coating layer is accelerated in the case of using the organopolysiloxane (a) and the organopolysiloxane (b) in combination for the hard coating layer forming composition. Besides, the alkoxy groups remaining unreacted when forming the hard coating layer may cause a decrease in abrasion resistance of the hard coating layer 4 and also cause microcracks when post-curing proceeds, so that the ratio of the hydroxyl groups relative to the alkoxy groups is preferably moderately large. The (Hy)/(Al) in the organopolysiloxane (a) is 12.0 to 100 and preferably 16.0 to 60.

If the value of the (Hy)/(Al) is less than 12.0, the ratio of the hydroxyl groups relative to the alkoxy groups is too small to fail to provide an effect of accelerating the curing reaction, and possibly results in a decrease in abrasion resistance due to the influence of the alkoxy groups, and causing microcracks when post-curing proceeds. In other words, if the value of the (Hy)/(Al) is less than 12.0, a part of the organopolysiloxane (a) is not incorporated into a three-dimensional crosslinked structure (network) formed by the curing reaction between the organopolysiloxane (a) and the organopolysiloxane (b) when forming the hard coating layer and becomes likely to bleed out and so on to result in a decrease in crosslink density, thereby possibly bringing about such problems that abrasion resistance cannot be obtained, the curing becomes difficult to sufficiently proceed and so on. If the value of the (Hy)/(Al) is more than 100, the ratio of the hydroxyl groups relative to the alkoxy groups is too large to possibly make the contraction stress of the hard coating layer by the curing reaction too large, thereby causing cracks.

The Mw of the organopolysiloxane (a) is 800 to 8,000 and preferably 1,000 to 6,000. With the Mw of the organopolysiloxane (a) falling within the range, the organopolysiloxane (a) and the organopolysiloxane (b), when used in combination for the hard coating layer forming composition, can sufficiently improve the abrasion resistance and the weather resistance of the hard coating layer 4 to be obtained.

To obtain the organopolysiloxane (a) used for forming the hard coating layer 4 excellent particularly in abrasion resistance, it is preferable to use, as a hydrolyzable silane compound being a raw material, methyltrialkoxysilane preferably having an alkoxy group with 1 to 3 carbon atoms for 70 mass % or more of all T monomers. However, a small amount of T monomer other than methyltrialkoxysilane can also be used in combination for the purpose of improving adhesiveness and exhibiting hydrophilic property, water repellency and so on.

As the method for manufacturing the organopolysiloxane (a), the monomer is subjected to a hydrolysis and condensation reaction in the presence of the acid catalyst in the solvent as described above. Here, the water required for the hydrolysis is generally 1 to 10 mol, preferably 1.5 to 7 mol, and furthermore preferably 3 to 5 mol relative to 1 mol of the monomer. At the time when subjecting the monomer to hydrolysis and condensation, the hydrolysis and condensation can also be carried out in a reaction system where colloidal silica (later described) exists. In the case of using a water dispersion type colloidal silica as the colloidal silica, water is supplied from the dispersion liquid. The amount of the acid catalyst used is preferably 0.1 to 50 mass % and particularly preferably 1 to 20 mass % relative to 100 mass % of the monomer. As the solvent, the above-described alcohol-based solvent is preferable and, concretely, at least one kind selected from among methanol, ethanol, 2-propanol, 1-butanol, and 2-butanol is particularly preferable in terms of excellent solubility of the organopolysiloxane (a) to be obtained.

Generally, a reaction temperature of 20 to 40° C. and a reaction time of 1 hour to several days are selected. The hydrolysis and condensation reaction of the monomer is an exothermic reaction, and the temperature of the system is preferably not higher than 60° C. The hydrolysis reaction is made to sufficiently proceed under such conditions, and then the condensation reaction is also preferably made to proceed at 40 to 80° C. for 1 hour to several days for stabilizing the organopolysiloxane to be obtained.

The organopolysiloxane (a) can be manufactured also from a commercially available organopolysiloxane. The commercially available organopolysiloxane is generally an organopolysiloxane high in ratio of the alkoxy groups as compared with the hydroxyl groups, and therefore it is particularly preferable to use a commercially available organopolysiloxane similar to the intended organopolysiloxane (a) except for the above-described (Hy)/(Al) and increase the ratio of the hydroxyl groups by the hydrolysis reaction so as to manufacture the organopolysiloxane (a).

Examples of the commercially available organopolysiloxane usable as the raw material of the organopolysiloxane (a) include the following organopolysiloxanes being partially hydrolyzed condensates of methyltrimethoxysilane. Note that the representation of "ND" indicates that a peak area ratio by $^{29}$Si-NMR is less than detectable amount when the peak area ratio is measured by using a nuclear magnetic resonance analyzer, ECP400 (trade name) manufactured by JEOL Ltd., (hereinafter, "ND" being used as the same meaning as the above).

A methyl-based silicone resin KR-220L (trade name, manufactured by Shin-Etsu Chemical Co., Ltd.); T0:T1:T2:T3=ND:ND:28:72, Si—OH/SiO—CH$_3$=11.7, Mw=4720, Mn=1200, Mw/Mn=3.93.

A methyl-based silicone resin KR-500 (trade name, manufactured by Shin-Etsu Chemical Co., Ltd.); T0:T1:T2:T3=ND:15:58:27, a peak originating from a Si—OH group being not confirmed by FT-IR, thereby substantially only SiO—CH$_3$ existing, Mw=1240, Mn=700, and Mw/Mn=1.77.

In the case where the organopolysiloxane (a) is manufactured from the above-described commercially available organopolysiloxane, the commercially available organopolysiloxane is preferably made to react in the presence of an acid catalyst to perform hydrolysis mainly of the alkoxy groups. Examples of the method for manufacturing the organopolysiloxane (a) from the above-described commercially available organopolysiloxane include a method of adding an amount of a solvent of 0 to 10 times (mass) that of the commercially available organopolysiloxane to the commercially available organopolysiloxane and then stirring them well, then adding an acid solution having a concentration of about 0.1 to 70 mass % thereto, and stirring them at a temperature of 15 to 80° C., preferably 20 to 70° C. for 1 to 24 hours, and the like. As the solvent to be used, a water solvent can be used, and the above-described alcohol-based solvent with water added thereto can also be used.

(Organopolysiloxane (b))

The organopolysiloxane (b) used in the present invention is an organopolysiloxane having silicon-containing bond units represented by the above-described T1 to T3, and having an Mw of 1/10 to 1/1.5 times the Mw of the organopolysiloxane (a). The ratio among the numbers of T1, T2, T3, the ratio of T3/T2, and the ratio of (Hy)/(Al) of the organopolysiloxane (b) are not particularly limited.

The Mw of the organopolysiloxane (b) is preferably 1/8 to 1/1.5 times that of the organopolysiloxane (a) to be combined therewith. If the Mw of the organopolysiloxane (b) is more than 1/1.5 times the Mw of the organopolysiloxane (a), in other words, the Mw of the organopolysiloxane (a) is less than 1.5 times the Mw of the organopolysiloxane (b), the toughness of the hard coating layer 4 to be obtained may decrease. The decrease in toughness causes cracks in the hard coating layer 4. Further, when the Mw of the organopolysiloxane (b) is less than 1/10 times the Mw of the organopolysiloxane (a), in other words, the Mw of the organopolysiloxane (a) is more than 10 times the Mw of the organopolysiloxane (b), the abrasion resistance of the hard coating layer 4 to be obtained decreases, thereby possibly failing to obtain the hard coating layer 4 having sufficient abrasion resistance.

A more preferable organopolysiloxane (b) is an organopolysiloxane having silicon-containing bond units represented by T0, T1, T2 and T3 at a ratio among numbers of the units in a range of T0:T1:T2:T3=0 to 5:0 to 50:5 to 70:10 to 90. The large proportions of T0 and T1 in the organopolysiloxane (b) generally mean that the hydrolysis reaction and the condensation reaction of the raw material monomer have been insufficient when manufacturing the organopolysiloxane. When the proportions of T0 and T1 are large in the organopolysiloxane (b), more cracks tend to occur in thermal curing when forming the hard coating layer 4 using the hard coating layer forming composition containing the organopolysiloxane (b) and the organopolysiloxane (a).

Further, generally when manufacturing an organopolysiloxane, the proportion of T3 in the organopolysiloxane to be obtained becomes high if the condensation reaction of the raw material monomer is made to proceed too much. When the proportion of T3 becomes high more than necessary in the organopolysiloxane (b), an appropriate cross-linking reaction becomes difficult in thermal curing when forming the hard coating layer 4 using the hard coating layer forming composition containing the organopolysiloxane (b) and the organopolysiloxane (a), and therefore it may become unable to form the hard coating layer 4 and may fail to obtain the hard coating layer 4 having sufficient abrasion resistance.

The organopolysiloxane (b) can be manufactured from the T monomer or the like similarly to the organopolysiloxane (a). In this case, when the monomer is subjected to the hydrolysis and the condensation similarly to the organopolysiloxane (a), the hydrolysis and the condensation can also be carried out in a reaction system where colloidal silica (later described) exists. Further, a commercially available organopolysiloxane can be used as it is as the organopolysiloxane (b). Examples of the commercially available organopolysiloxane which can be used as the organopolysiloxane (b) include the following organopolysiloxanes. Note that the representation of "trace" indicates that a peak area ratio by $^{29}$Si-NMR is 0.01 or more and 0.25 or less when the peak area ratio is measured by using the nuclear magnetic resonance analyzer, manufactured by JEOL Ltd., ECP400 (trade name) (hereinafter, "trace" being used as the same meaning as the above).

TOSGUARD 510 (trade name, manufactured by Momentive Performance Material Inc.); molecular weight: Mn=1370, Mw=1380, Mw/Mn=1.01. The number of the T units:(total of the numbers of the M units, D units, and Q units)=99.9 or more:ND. T0: T1: T2: T3=ND:2:36:62.

KP851 (trade name, manufactured by Shin-Etsu Chemical Co., Ltd); molecular weight: Mn=1390, Mw=1400, Mw/Mn=1.01. The number of the T units:(total of the numbers of the M units, D units, and Q units)=99.9 or more:ND. T0:T1:T2:T3=trace:21:58:21.

(Hard Coating Layer Forming Composition)

In the step (3), a hard coating layer forming composition containing the organopolysiloxane (S) as a main component is applied on the primer layer 2 of the resin substrate with a resin film laminate 11 and cured to form the hard coating layer 4.

The content of the organopolysiloxane (S) in the hard coating layer forming composition is 50 to 100 mass % and preferably 60 to 95 mass % relative to the total amount of the solid content except the volatile component such as the solvent and the like.

As the organopolysiloxane (S) in the hard coating layer forming composition, the organopolysiloxanes (T) are preferable as described above, and the combination of the organopolysiloxane (a) and the organopolysiloxane (b) among the organopolysiloxanes (T) is more preferable. Regarding the content ratio between the organopolysiloxane (a) and the organopolysiloxane (b), a preferable ratio of the organopolysiloxane (b) is 100 to 500 mass % relative to 100 mass % of the organopolysiloxane (a).

The ratio of the organopolysiloxane (b) is more preferably 150 to 400 mass % relative to 100 mass % of the organopolysiloxane (a). The organopolysiloxane (S) can contain an organopolysiloxane other than the organopolysiloxane (a) and the organopolysiloxane (b), at a proportion of 20 mass % or less to the total amount of the organopolysiloxane (S). In this case, the organopolysiloxane (T) is preferable also as the organopolysiloxane other than the organopolysiloxane (a) and the organopolysiloxane (b). The organopolysiloxane (S) is preferably composed of only the organopolysiloxane (a) and the organopolysiloxane (b). The organopolysiloxane (S) contains both of them at the above-described ratio, so that the three-dimensional crosslinked structure of the organopolysiloxane formed by the curing reaction becomes a configuration in which the organopolysiloxane (a) is moderately incorporated in the three-dimensional crosslinked structure of the main organopolysiloxane (b), and thereby can improve the weather resistance and the abrasion resistance of the hard coating layer 4 to be obtained.

Note that the hard coating layer 4 and the primer layer 2 are estimated to be mixed with each other at the interface between them, and therefore sufficient adhesiveness is secured between the hard coating layer 4 and the primer layer 2. Since the primer layer 2 sufficiently adheres to the resin film 1, the adhesiveness is secured for the whole resin substrate with a hard coating film 20 to be obtained. Further, almost the whole hard coating layer 4 except the vicinity of the interface with the primer layer 2 is composed of only components obtained by independently curing the hard coating layer forming composition, and the hard coating layer 4 therefore has excellent abrasion resistance.

The hard coating layer forming composition used in the present invention may contain various additives in addition to the above-described organopolysiloxane (S). For example, the hard coating layer 4 preferably contains silica fine particles to further improve the abrasion resistance of the hard coating layer 4 of the resin substrate with a hard coating film 20 to be obtained, and therefore a hard coating layer forming composition containing silica fine particles is preferably used. To compound the silica fine particles in the hard coating layer forming composition, it is concretely preferable to compound colloidal silica. Note that the colloidal silica refers to silica fine particles dispersed in water or an organic solvent such as methanol, ethanol, isobutanol, propylene glycol monomethyl ether or so on.

Further, the silica fine particles can be compounded in a monomer being the raw material in the manufacturing process of the above-described organopolysiloxane (S). By manufacturing the organopolysiloxane (S) in a reaction system containing the colloidal silica, an organopolysiloxane (S) containing silica fine particles is obtained. For example, by adding the T monomer and, as necessary, water and an acid catalyst to the colloidal silica, the organopolysiloxane (S) can be manufactured as described above in the dispersion medium of the colloidal silica. Using the organopolysiloxane (S) thus obtained, the hard coating layer forming composition containing silica fine particles can be manufactured.

The above-described silica fine particles contained in the hard coating layer forming composition preferably have an average particle diameter (BET method) of 1 to 100 nm. An average particle diameter of more than 100 nm may be unfavorable in terms of optical quality because the particles irregularly reflect light to increase the value of haze of the hard coating layer 4 to be obtained. Further, the average particle diameter is particularly preferably 5 to 40 nm. This is for keeping the transparency of the hard coating layer 4 while imparting abrasion resistance to the hard coating layer 4. Further, both of water dispersion type and organic solvent dispersion type of colloidal silica can be used, and it is preferable to use the water dispersion type. Furthermore, it is particularly preferable to use colloidal silica dispersed in an acid aqueous solution. Further, the colloidal silica can also be made to contain inorganic fine particles other than the silica fine particles, such as alumina sol, titania sol, or ceria sol.

The content of the silica fine particles in the hard coating layer forming composition is preferably an amount to be 1 to 50 mass % and more preferably an amount to be 5 to 40 mass % relative to the total amount of the solid content. When a content of the silica fine particles in the solid content in the hard coating layer forming composition is less than 1 mass %, it may be impossible to secure sufficient abrasion resistance in the hard coating layer 4 to be obtained, whereas when the content is more than 50 mass %, the proportion of the organopolysiloxane (S) in the solid content becomes too low, resulting in a possibility of difficulty in forming the hard coating layer by thermal curing of the organopolysiloxane (S), occurrence of cracks in the hard coating layer 4 to be obtained, occurrence of aggregation of silica fine particles to decrease the transparency of the hard coating layer 4 and so on.

The hard coating layer forming composition may further contain additives such as a defoaming agent and a viscosity modifier for the purpose of improving the coatability, may contain additives such as an adhesion promoter for the purpose of improving adhesiveness with the primer layer 2, and may contain a leveling agent as an additive for the purpose of improving the coatability and the smoothness of a coating film to be obtained. As the compounding amounts of the additives, an amount of each of the additives is preferably 0.01 to 2 mass % relative to 100 mass % of the organopolysiloxane (S). Further, the hard coating layer forming composition may contain a dye, a pigment, a filler and so on in a range not impairing the object of the present invention.

The hard coating layer forming composition may further contain a curing catalyst. Examples of the curing catalyst include: alkali metal salts such as lithium salts, sodium salts, and potassium salts of aliphatic carboxylic acids (a formic acid, an acetic acid, a propionic acid, a butyric acid, a lactic acid, a tartaric acid, a succinic acid and the like); quaternary ammonium salts such as a benzyltrimethylammonium salt, a tetramethylammonium salt, and a tetraethylammonium salt; alkoxides and chelates of metals such as aluminum, titanium, and cerium; and an ammonium perchlorate, an ammonium chloride, an ammonium sulfate, a sodium acetate, imidazoles and their salts, ammonium trifluoromethylsulfonate, bis (trifluoromethylsulfonyl)bromomethyl ammonium and the like. The compounding amount of the curing catalyst is preferably 0.01 to 10 mass % and more preferably 0.1 to 5 mass % relative to 100 mass % of the organopolysiloxane (S). When the content of the curing catalyst is less than 0.01 mass %, sufficient curing rate is hardly obtained, whereas when the content is more than 10 mass %, the preservation stability of the hard coating layer forming composition may decrease and a deposit may be generated.

Further, the hard coating layer forming composition preferably further contains an ultraviolet absorbent for suppressing yellowing of the resin substrate. Examples of the ultraviolet absorbent include a benzophenone-based ultraviolet absorbent, a benzotriazole-based ultraviolet absorbent, a benzimidazole-based ultraviolet absorbent, a cyanoacrylate-based ultraviolet absorbent, a salicylate-based ultraviolet absorbent, a benzylidene malonate-based ultraviolet absorbent, a triazine-based ultraviolet absorbent, and the like. One kind of the ultraviolet absorbents may be used or two or more kinds of them may be used in combination. Further, to suppress bleeding-out of the above-described ultraviolet absorbent from the hard coating layer 4, an ultraviolet absorbent having a trialkoxysilyl group may be used. Alkoxy groups bonded to silicon atom of the ultraviolet absorbent having the trialkoxysilyl group can be converted into a hydroxyl group by the hydrolysis reaction when forming the hard coating layer by thermal curing of the organopolysiloxane (S), then incorporated into the hard coating layer by the dehydration condensation reaction to suppress bleeding-out of the ultraviolet absorbent from the hard coating layer. Concrete examples of the trialkoxysilyl group include a trimethoxysilyl group, a triethoxysilyl group and the like. The content of the ultraviolet absorbent in the hard coating layer forming composition is preferably 0.1 to 30 mass % and particularly preferably 0.1 to 15 mass % relative to 100 mass % of the organopolysiloxane (S).

In normal use, the hard coating layer forming composition preferably has a pH adjusted to 3.5 to 6.0 and more preferably adjusted to 3.5 to 5.0 for preventing gelation of the hard coating layer forming composition at normal temperature and increasing the preservation stability. Under a condition of a pH of 2.0 or less or 7.0 or more, the hydroxyl group bonded to the silicon atom is extremely unstable, and therefore the hard coating layer forming composition is not suitable for preservation. The range of pH in the hard coating layer forming composition used in the present invention depends on the kind and the Mw of the acrylic polymer (A) used for the primer layer, the kind and the compounding amount of the ultraviolet absorbent, the kind of the organopolysiloxane (S) contained in the hard coating layer forming composition, the film thickness of the primer layer, the film thickness of the hard coating layer to be finally obtained, the coating method of the hard coating layer forming composition, and the drying and curing methods of the hard coating layer forming composition and so on, and a particularly preferable range of pH can be almost 3.5 to 4.5.

Examples of the method of adjusting pH include addition of an acid, adjustment of the content of the curing catalyst, and the like. Example of the acid include: inorganic acids such as a hydrochloric acid, a sulfuric acid, a nitric acid, a phosphoric acid, a nitrous acid, a perchloric acid, and a sulfamic acid; and organic acids such as a formic acid, an acetic acid, a propionic acid, a butyric acid, an oxalic acid, a succinic acid, a maleic acid, a lactic acid, and a p-toluenesulfonic acid, and among them, the acetic acid or the hydrochloric acid is preferable.

The hard coating layer forming composition used in the present invention is generally prepared in such a form that the organopolysiloxane (S) being an essential component and the various additives being arbitrary components are dissolve and dispersed in a solvent. The all solid content in the above-described hard coating layer forming composition needs to be stably dissolved and dispersed in the solvent, and therefore the solvent contains at least 20 mass % or more and preferably 50 mass % or more of alcohol.

The alcohol used for the solvent is preferably at least one kind selected from among methanol, ethanol, 1-propanol, 2-propanol, 1-butanol, 2-butanol, 2-methyl-1-propanol, 1-methoxy-2-propanol, 2-ethoxyethanol, diacetone alcohol, 2-butoxyethanol, and the like. Among them, alcohol having a boiling point of 80 to 160° C. is preferable in terms of excellent solubility of the organopolysiloxane and excellent coatability. Concretely, the alcohol is preferably at least one kind selected from among ethanol, 1-propanol, 2-propanol, 1-butanol, 2-butanol, 2-methyl-1-propanol, 1-methoxy-2-propanol, 2-ethoxyethanol, diacetone alcohol, and 2-butoxyethanol.

The solvent used for the hard coating layer forming composition includes: lower alcohol and the like generated accompanying hydrolysis of the raw material monomer, for example, alkyltrialkoxysilane when manufacturing the organopolysiloxane (S); moisture being water in the water dispersion type of colloidal silica and uninvolved in the hydrolysis; and a dispersed organic solvent in the case of using the organic solvent dispersion type of colloidal silica.

Further, in the hard coating layer forming composition used in the present invention, as a solvent other than the above-described solvent, another solvent other than alcohol which can be mixed with a mixture of water and alcohol may be used together. Examples of the solvent include: ketones such as acetone and acetylacetone; esters such as ethyl acetate and isobutyl acetate; and ethers such as propylene glycol monomethyl ether, dipropylene glycol monomethyl ether, and diisopropyl ether.

The amount of the solvent used in the hard coating layer forming composition is preferably 50 to 3,000 mass % and more preferably 150 to 2,000 mass % relative to 100 mass % of the total solid content in the hard coating layer forming composition.

In the step (3), the above-described hard coating layer forming composition is applied on the primer layer 2 of the resin substrate with a resin film laminate 11 obtained in the above-described step (2) to form a applied film, and the curable component containing the organopolysiloxane (S) as a main component in the applied film is cured to form the hard coating layer 4. Thus, the resin substrate with a hard coating film 20 an example of whose cross-sectional view is illustrated in FIG. 1 is obtained.

Note that in the step (3), the hard coating layer forming composition after application has sufficient affinity with a surface layer of the primer layer 2 at the interface with the primer layer 2, and a portion affinity with the surface layer is supposed to form a mixed region in the above-described curing to be subsequently performed. The mixed region exists as an ultrathin layer in the vicinity of the interface between the primer layer 2 and the hard coating layer 4 and is not illustrated in the cross-sectional view of the resin substrate with a hard coating film 20 illustrated in FIG. 1, but the sufficient adhesiveness in the resin substrate with a hard coating film 20 is considered to be secured due to the presence of the mixed region.

The method for applying the hard coating layer forming composition is not particularly limited. Generally, the coating method is appropriately selected from the various coating methods by the wet method as in the case of the above-described primer layer forming composition, in accordance with the shape, the size and so on of the coating surface. Concrete examples of the coating method by the wet method include ordinary coating methods such as a spray coating method, a dip coating method, a flow coating method, a die coating method, a spin coating method and the like. Among them, the flow coating method is preferable from the viewpoint of the possibility of sufficiently improving the weather resistance, the adhesiveness with the primer layer and so on. Note that it is preferable to appropriately adjust the viscosity, the solid content concentration and so on of the hard coating layer forming composition in accordance with the coating method.

The hard coating layer forming composition applied on the primer layer 2 is generally heat cured after the solvent is dried and removed under a temperature condition of room temperature to a temperature that is lower than a thermal deformation temperature of the resin substrate 3, the resin film 1, and the primer layer 2. As the dry condition of the solvent, for example, a condition of 20 to 60° C. for 15 minutes to 10 hours can be exemplified. Further, vacuum drying may be used while adjusting the pressure reduction degree. The thermal curing reaction is preferably performed at a high temperature in a range causing no problem in heat resistance of the resin substrate 3, the resin film 1, and the primer layer 2 because curing can be completed earlier. However, in the case of using, as the organopolysiloxane (S), the organopolysiloxane (a) and the organopolysiloxane (b) having R being a methyl group, a temperature in heat curing of 250° C. or higher is not preferable because the methyl group separates due to thermal decomposition. Therefore, the curing temperature is preferably 50 to 200° C., particularly preferably 80 to 160° C., and especially preferably 90° C. to 140° C. The curing time is preferably 10 minutes to 4 hours, particularly preferably 20 minutes to 3 hours, and especially preferably 30 minute to 2 hours.

The film thickness (film thickness before curing) of the applied film to be formed by applying the hard coating layer forming composition on the primer layer 2 depends on the solid content concentration in the composition. It is preferable to appropriately adjust the film thickness by taking the solid content concentration into consideration so that the film thickness of the hard coating layer to be formed after the hard coating layer forming composition is cured falls within the following range.

The film thickness of the hard coating layer is preferably 1 μm or more and 20 μm or less, furthermore preferably 1 μm or more and 10 μm or less, and particularly preferably 2 μm or more and 10 μm or less. Note that the film thickness of the hard coating layer means the thickness of the hard coating layer obtained by forming a film using independently the hard coating layer forming composition on a substrate such as a resin substrate.

In the manufacturing method of the present invention, when the film thickness of the hard coating layer is too small, it may be difficult to secure sufficient abrasion resistance in the resin substrate with a hard coating film to be obtained. On the other hand, when the film thickness of the hard coating layer is too large, cracks and peeling may become likely to occur. Accordingly, to suppress occurrence of cracks and peeling while securing sufficient abrasion resistance, the film thickness of the hard coating layer is preferably 1 μm or more and 20 μm or less.

The embodiment of the manufacturing method of the resin substrate with a hard coating film of the present invention has been described by way of examples, but the manufacturing method of the present invention is not limited to those examples. The configuration can be appropriately changed without departing the scope of the present invention and according to demand.

In the above manner, the resin substrate with a hard coating film of the present invention is obtained by the manufacturing method of the present invention. The resin substrate with a hard coating film of the present invention has a hard coating film composed of a primer layer and a hard coating layer by forming a resin substrate by injection molding on another surface of a resin film having the primer layer of the above configuration on its one surface and further applying a hard coating layer forming composition on the primer layer and curing it, and is excellent in adhesiveness and abrasion resistance and also excellent in weather resistance such as weather resistant adhesiveness, weather-crack resistance and so on. Furthermore, the resin substrate with a hard coating film is high in productivity by being manufactured by the above-described manufacturing method of the present invention.

Note that in the resin substrate with a hard coating film of the present invention, a topcoating layer having a main component of $SiO_2$ may be provided on the hard coating layer of the resin substrate with a hard coating film for further improving the abrasion resistance and the film strength. As the method for forming the topcoating layer having a main component of $SiO_2$, it is preferable to apply a method of coating the top of the hard coating layer with poly(perhydro)silazane and curing it, methods such as vapor deposition, sputtering or the like.

EXAMPLES

Hereinafter, the present invention will be described in more detail using examples, but the present invention is not limited by these examples. Examples 1 to 4 are examples, and Examples 5 to 10 are comparative examples.

In each of the examples, a primer layer forming composition (P-1) and a hard coating layer forming composition (HC-1) which were prepared as follows were used. However, for Example 9 and Example 10, the primer layer forming composition (P-1) was not used but a commercially available product having a primer layer formed by coextrusion with a resin film was used.

[Preparation of the Primer Layer Forming Composition]

Polymethyl methacrylate (PMMA) (Mn=120,000, Mw=340,000, degree of dispersion (Mw/Mn)=2.8, acid value of 0 mgKOH/g, Tg; 105° C.) and dibenzoylresorcinol (DBR, manufactured by Clariant AG, average value of absorption constant at 350 to 380 nm; 5.5 g/(mg·cm)) as the benzophenol-based ultraviolet absorbent were compounded at such a ratio of 30 mass % of DBR to 100 mass % of PMMA. This mixture was dissolved in a solvent composed of 1-methoxy-2-propanol:diacetone alcohol=85:15 (mass ratio) and adjusted so that the solid content was 10 mass %, whereby the primer layer forming composition (P-1) was obtained.

Note that the Mn, Mw and Mw/Mn of the polymethyl methacrylate were obtained by gel permeation chromatography (GPC, HLC-8220GPC manufactured by Tosoh Corporation, RI detection, column: TSKguardcolumn SuperHZ-L+TSKgel Super HZ4000+HZ3000+HZ2500+HZ 2000, eluent: THF).

[Preparation of the Hard Coating Layer Forming Composition]

The hard coating layer forming composition was prepared by the following method. Note that the analysis of the organopolysiloxane was performed by the following method.

(1) The Ratio of the Number of Hydroxyl Groups (Hy) Bonded to Silicon Atoms to the Number of Alkoxy Groups (Al) Bonded to Silicon Atoms: (Hy)/(Al)

Since the organopolysiloxane used in each of the examples illustrated below was only the one having silicon atom-bonded methoxy groups (SiO—$CH_3$) as the silicon atom-bonded alkoxy groups, the ratio of Si—OH/SiO—$CH_3$ obtained by the following method was used as the above-described (Hy)/(Al). More specifically, the ratio between the numbers of Si—OH/SiO—$CH_3$ was obtained from an area ratio between absorption originating from Si—OH near 900 $cm^{-1}$ and absorption originating from SiO—$CH_3$ near 2860 $cm^{-1}$ using an infrared absorption spectrometer (FT-IR, manufactured by Thermo Fisher Scientific Inc., model: Avatar/Nicolet FT-IR360).

(2) Analysis of the Bonding State of the Silicon Atom in the Organopolysiloxane

The bonding state of the silicon atom in the organopolysiloxane, more specifically, the abundance ratio among T0 to T3 was obtained from the peak area ratio by $^{29}$Si-NMR using the nuclear magnetic resonance analyzer ($^{29}$Si-NMR: manufactured by JEOL Ltd., ECP400). The measurement conditions are use of a 10 mmφ sample tube made of polytetrafluoroethylene (PTFE), proton decoupling, a pulse width of 45°, a waiting time of 15 sec, a relaxation reagent: 0.1 mass % of Cr (acac)$_3$, and an external standard sample: tetramethylsilane. Further, the chemical shift by $^{29}$Si-NMR originating from each structure is as follows.

(T0 to T3)
T0: −40 to −41 ppm
T1: −49 to −50 ppm
T2: −57 to −59 ppm
T3: −66 to −70 ppm (3) The Mn, Mw, and Degree of Dispersion (Mw/Mn)

The Mn, Mw and degree of dispersion (Mw/Mn) were obtained by gel permeation chromatography (GPC, Waters 2695 manufactured by Waters Corporation, RI detection, column: Styragel guard column+HR1+HR4+HR5E, eluent: chloroform).

Preparation Example 1: Synthesis of the Organopolysiloxane (a) and Preparation of a Solution Containing the Organopolysiloxane (a)

In a 0.2 L flask, 10 g of 1-butanol was added to 10 g of a methyl-based silicones resin KR-500 (manufactured by Shin-Etsu Chemical Co., Ltd., a peak originating from a Si—OH group not confirmed by FT-IR and thus substantially only SiO—$CH_3$ contained, the abundance ratio among the T units being T0:T1:T2:T3=ND:15:58:27, Mn=700, Mw=1240, Mw/Mn=1.77) and they were well stirred, and 10 g of an acetic acid and 10 g of ion-exchange water were added thereto and they were further stirred. This solution was stirred at 40° C. for 16 hours, whereby a solution containing an organopolysiloxane MSi-1 (hereinafter referred to only as "MSi-1", concentration of MSi-1: 25 mass %) was obtained as the organopolysiloxane (a).

By comparison of the obtained MSi-1 with the KR-500 being the raw material by the FT-IR and $^1$H-NMR, reduction of the peak originating from a SiO—$CH_3$ group and appearance of a peak originating from a Si—OH group were confirmed. The ratio of Si—OH/SiO—$CH_3$ ((Hy)/(Al)) in MSi-1 obtained from the peak area ratio of FT-IR was 49.2. MSi-1 was composed of T units, and the abundance ratio among the T units obtained from the chemical shift by $^{29}$Si-NMR was such that T0:T1:T2:T3=ND:2:38:60, T3/T2=1.6, (T2+T3)/(T1+T2+T3)=0.98. Further, the Mn of MSi-1 was 520, the Mw was 1,150, and the Mw/Mn was 2.22.

Preparation Example 2: Synthesis of the Organopolysiloxane (b) and Preparation of a Solution of the Organopolysiloxane (b)

In a 1 L flask, 174 g of water dispersible silica sol having an average particle diameter of about 30 nm (pH 3.1, silica fine particle solid content; 20 mass %) and 14 g of an acetic acid were charged, and 194 g of methyltrimethoxysilane was added thereto. After stirring for 1 hour, the pH of the composition stabilized at 4.5. This composition was aged at 25° C. for 4 days, and subjected to partial hydrolysis and condensation. Thus, a solution containing a silica-containing organopolysiloxane PSi-1 (hereinafter referred to only as "PSi-1", concentration of PSi-1: 44 mass %, silica sol in PSi-1: organopolysiloxane (b)=34.8:94 (mass ratio)) was obtained as the organopolysiloxane (b) containing silica sol.

The organopolysiloxane (b) in the obtained PSi-1 had a bonded structure mainly using T units, the abundance ratio among the T units obtained from the chemical shift by $^{29}$Si-NMR was such that T0:T1:T2:T3=ND:2:54:44. In the obtained organopolysiloxane (b), little or no monomer-like T0 body [R—Si(OH)$_3$] (R being $CH_3$) existed, and therefore it was confirmed that methyltrimethoxysilane being the raw material was almost completely converted to an oligomer-like organopolysiloxane. The Mn of the obtained organopolysiloxane (b) was 400, the Mw was 670, and the Mw/Mn was 1.68.

Then, 4 mass % of the benzophenone-based ultraviolet absorbent was added to 100 mass % of the solution of PSi-1 obtained in the above, and they were aged at 25° C. for 24 hours or more. As a diluent solvent, a mixed solvent composed of 1-butanol:2-propanol:methanol:1-methoxy-2-propanol at 40:40:15:5 (mass ratio) was used to prepare a solution of the PSi-1 composition containing an organopolysiloxane (b) having 25 mass % of the solid content (150° C., 45 minutes) and a viscosity of 4.4 mPa·s.

Preparation Example 3: Preparation of the Hard Coating Layer Forming Composition (HC-1)

In the solution containing MSi-1 obtained in the above-described preparation example 1, the solution containing PSi-1 obtained in the above-described preparation example 2 was compounded at MSi-1:PSi-1=20:80 (mass ratio) and they were well mixed, whereby the hard coating layer forming composition (HC-1) was obtained. Here, the ratio of the organopolysiloxane (b) to 100 mass % of the organopolysiloxane (a) in the hard coating layer forming composition (HC-1) was 300 mass %.

Example 1

[The Step (1): The Primer Layer Forming Step]
A bisphenol A-based polycarbonate resin film (manufactured by Asahi Glass Co., Ltd.) with a thickness of 200 μm was coated with the primer layer forming composition (P-1) by the die coating method, and heated at 130° C. for 3 minutes and thereby dried. Further, by using a convection type drier (manufactured by Kusumoto Chemicals. Ltd., HISPEC HS250), the primer layer forming composition (P-1) was heated at 120° C. for 30 minutes and thereby dried, whereby a resin film with a primer layer 10A was obtained. (step (1)). The film thickness of the primer layer in the obtained resin film with a primer layer was 4.9 μm, and no residual solvent was detected in the primer layer.

Note that the amount of the residual solvent in the primer layer was obtained by dissolving the primer layer in deuteriochloroform and using the nuclear magnetic resonance analysis ($^1$H-NMR, AL300 manufactured by JEOL Ltd.). In each of the following examples, the amount of the residual solvent in the primer layer was measured by the same method.

[The Step (2): The Injection Molding Step]
Three sheets made by cutting the resin film laminate 10A obtained in the above into 400 mm×400 mm were produced, and each of them was subjected to the following injection molding and further to the step (3): the hard coating layer forming step.

The resin film laminate 10A was placed such that the primer layer was in contact with the bottom surface of a lower mold of a flat mold composed of an upper mold and the lower mold (a cavity size when the mold was closed: 400 mm×400 mm, and a thickness of 4 mm), and the upper mold was used to close the mold. Then, the upper mold and the lower mold were opened slightly (2 mm), and a bisphenol A-based polycarbonate resin (manufactured by Bayer AG, AG-2677 (trade name), Mw; 48,000) was injected into a cavity of the flat mold under molding conditions of a molten resin temperature of 300° C. and a mold temperature of 90° C. Immediately after the inside of the cavity was filled with the molten resin to achieve a filing factor of 100% with the upper mold and the lower mold opened, the upper mold was moved at a rate of 2 mm/sec to close the mold. Thereafter, a molded product was taken out of the flat mold, whereby a resin substrate with a resin film laminate was obtained (step (2)).

[The Step (3): The Hard Coating Layer Forming Step]
On the primer layer of the resin substrate with a resin film laminate obtained in the above-described injection molding step, the hard coating layer forming composition (HC-1)

was applied by the flow coating method in such an amount that a film thickness when the composition was independently applied and cured on the resin substrate became 6.0 µm, and left as it was at 25° C. for 20 minutes, and then heated at 120° C. for 1 hour and thereby dried. In such a manner, a resin substrate with a hard coating film 20A having the polycarbonate resin substrate and the polycarbonate resin film laminated in this order from the bottom and having the hard coating film composed of the primer layer and the hard coating layer thereon was produced (step (3)).

Example 2

A resin film with a primer layer 10B was produced as in Example 1 except for use of a bisphenol A-based polycarbonate resin film (manufactured by Asahi Glass Co., Ltd.) with a thickness of 250 µm, and three sheets made by cutting this into 400 mm×400 mm were produced. The film thickness of the primer layer in the obtained resin film with a primer layer was 4.9 µm, and no residual solvent was detected in the primer layer.

A resin substrate with a hard coating film 20B was produced as in Example 1 except for use of the resin film laminate 10B.

Example 3

The bisphenol A-based polycarbonate resin film (manufactured by Asahi Glass Co., Ltd.) with a thickness of 250 µm was coated with the primer layer forming composition (P-1) by the spin coating method. Then, this was left as it was at 25° C. for 20 minutes, and then heated at 120° C. for 30 minutes using a convection type drier (manufactured by Kusumoto Chemicals. Ltd., HISPEC HS250) and thereby dried and cured, whereby a resin film with a primer layer 10C was obtained. The film thickness of the primer layer in the obtained resin film with a primer layer was 4.5 µm, and 0.92 mass % of diacetone alcohol remained relative to 100 mass % of the total solid content (PMMA+DBR) in the primer layer.

A resin substrate with a hard coating film 20C was produced by performing the step (2): the injection molding step and the step (3): the hard coating layer forming step as in Example 1 except for use of the resin film laminate 10C.

Example 4

A resin film with a primer layer 10B was produced as in Example 2. The step (2): the injection molding step was performed as in Example 2 using the obtained resin film with a primer layer 10B. Then, the step (3): the hard coating layer forming step was performed as in Example 2 except for use of the dip coating method to produce a resin substrate with a hard coating film 20D. Note that the thickness of the hard coating layer was set to 4.6 µm.

Example 5

A resin film with a primer layer 10D was produced as in Example 1 except for use of a bisphenol A-based polycarbonate resin film (manufactured by Asahi Glass Co., Ltd.) with a thickness of 500 µm. The film thickness of the primer layer in the obtained resin film with a primer layer was 4.9 µm, and no residual solvent was detected in the primer layer.

It was tried to produce a resin substrate with a hard coating film as in Example 1 except for use of the resin film laminate 10D, but the polycarbonate resin film melted in the step (2): the injection molding step, and cloudiness occurred in the vicinity of the interface of the polycarbonate resin film with the injection-molded resin substrate in the resin substrate with a resin film laminate, and therefore the hard coating layer forming step being the step (3) was not performed.

Example 6

A resin film with a primer layer 10E was produced as in Example 1 except for use of a bisphenol A-based polycarbonate resin film (manufactured by Asahi Glass Co., Ltd.) with a thickness of 130 µm. The film thickness of the primer layer in the obtained resin film with a primer layer was 4.9 µm, and no residual solvent was detected in the primer layer.

It was tried to produce a resin substrate with a hard coating film as in Example 1 except for use of the resin film laminate 10E, but wrinkling occurred on the surface on the primer layer side of the resin substrate with a resin film laminate in the step (2): the injection molding step, and therefore the hard coating layer forming step being the step (3) was not performed.

Example 7

The bisphenol A-based polycarbonate resin film (manufactured by Asahi Glass Co., Ltd.) with a thickness of 250 µm was coated with the primer layer forming composition (P-1) by the die coating method, and heated at 130° C. for 6 minutes and thereby dried, whereby a resin film with a primer layer 10F was obtained. The film thickness of the primer layer in the obtained resin film with a primer layer was 4.9 µm, and 1.54 mass % of diacetone alcohol remained relative to 100 mass % of the total solid content (PMMA+DBR) in the primer layer.

It was tried to produce a resin substrate with a hard coating film as in Example 1 except for use of the resin film laminate 10F, but cloudiness occurred in the surface on the primer layer side of the resin substrate with a resin film laminate in the step (2): the injection molding step, and therefore the hard coating layer forming step being the step (3) was not performed.

Example 8

A resin film with a primer layer 10G was obtained as in Example 7 except that the heating after application of the primer layer forming composition was performed at 130° C. for 3 minutes. The film thickness of the primer layer in the obtained resin film with a primer layer was 4.9 µm, and 6.15 mass % of diacetone alcohol remained relative to 100 mass % of the total solid content (PMMA+DBR) in the primer layer.

It was tried to produce a resin substrate with a hard coating film as in Example 1 except for use of the resin film laminate 10G, but cloudiness occurred in the surface on the primer layer side of the resin substrate with a resin film laminate in the step (2): the injection molding step, and therefore the hard coating layer forming step being the step (3) was not performed.

Example 9

It was tried to produce a resin substrate with a hard coating film as in Example 1 except for use of a polycarbonate/PMMA coextrusion film (C003, manufactured by Sumitomo Chemical Co., Ltd., a polycarbonate film thickness of 110 μm/a PMMA film thickness of 15 μm) as the resin laminate, but wrinkling occurred on the surface on the primer (PMMA) layer side of the resin substrate with a resin film laminate in the step (2): the injection molding step, and therefore the hard coating layer forming step being the step (3) was not performed.

Note that the PMMA in the PMMA layer in the above-described polycarbonate/PMMA coextrusion film had Mn=33,000, Mw=99,000, degree of dispersion (Mw/Mn)= 3.0, Tg; 99° C. Further, the PMMA layer contained 0.75 mass % of a benzotriazole-based compound as the ultraviolet absorbent relative to 100 mass % of PMMA.

Example 10

A resin substrate with a hard coating film 20E was produced by performing the step (2): the injection molding step and the step (3): the hard coating layer forming step as in Example 1 except for use of a polycarbonate/PMMA coextrusion film (C003, manufactured by Sumitomo Chemical Co., Ltd., a polycarbonate film thickness of 170 μm/a PMMA film thickness of 30 μm) as the resin film laminate.

Note that the PMMA layer in the above-described polycarbonate/PMMA coextrusion film was similar to the PMMA layer in the polycarbonate/PMMA coextrusion film used in the above-described Example 9 except for the thickness.

[Evaluation of the Resin Substrate with a Hard Coating Film]

In the above Examples 1 to 10, the external appearance of the resin substrate with a resin film laminate obtained in the step (2): the injection molding step was evaluated. Further, for the resin substrates with hard coating films 20A to 20E obtained in Examples 1 to 4 and 10 respectively, the external appearance, abrasion resistance, and adhesiveness at an initial stage, and weather-crack resistance and weather resistant adhesiveness after weather resistance test were evaluated by the following methods. The results are listed in Table 1 together with the thickness of the polycarbonate resin film, the composition of the primer layer, the primer layer and hard coating layer forming methods, and so on.

<1> Injection Molding Step Evaluation
<1-1> Initial External Appearance of the Resin Substrate with a Resin Film Laminate (Injection-Molded Product)

For three pieces of resin substrates with resin film laminates produced in each of the above-described examples, the external appearance (the presence or absence of wrinkling on the surface and cloudiness) after the injection molding (step (2)) and before the hard coating layer coating (step (3)) was visually observed, and the presence or absence of an abnormality was determined according to the following criteria.

○: neither of wrinkling nor cloudiness is observed in three pieces
Δ: either wrinkling or cloudiness is observed in one or two pieces
X: either wrinkling or cloudiness is observed in three pieces
<2> Initial Evaluation
<2-1> Initial External Appearance For the three pieces of each of the resin substrates with hard coating films 20A to 20E obtained in Examples 1 to 4 and 10 respectively, the initial external appearance of the hard coating film was visually observed, and the presence or absence of an abnormality was determined according to the following criteria.

○: no abnormality in three pieces
X: crack, peeling or surface property defect present in the hard coating film in at least one of three pieces As for each of the three pieces of resin substrate with a hard coating film, a test piece was cut from an arbitrary one selected from among them into a size suitable for each following test, and supplied for each of an initial abrasion resistance test, an initial adhesiveness test, and a weather resistance test.

<2-2> Initial Abrasion Resistance

The haze before test of a test piece of 100×100 mm was measured in conformity to JIS K7105 (6.4) using a haze meter (manufactured by Suga Test Instrument Co., Ltd., model: HGM-2). Further, test of 500 rotations under a load of 500 g using a Taber's abrasion resistance tester (manufactured by TOYO SEMI SEISAKU-SHO LTD., model: ROTARY ABRASION TESTER) with an abrasion wheel CALIBRASE (registered trademark) CS-10F (manufactured by TABER Industries) attached thereto was performed in conformity to JIS K5600 (5.9). Then the haze after test was measured. A haze difference $\Delta H_{500}$ between before test and after test was regarded as the abrasion resistance. As the determination criteria of the abrasion resistance, an abrasion resistance of $\Delta H_{500} \leq +10$ is determined to be acceptable.

<2-3> Initial Adhesiveness

As for a test piece of 100×25 mm, 11 cut lines at an interval of 1 mm in each of the vertical and horizontal directions were made in the hard coating film using a razor blade to produce 100 grid squares and CELLOTAPE (registered trademark) (manufactured by NICHIBAN CO., LTD., CT24) was well bonded thereto, and then subjected to a peeling test in conformity to JIS K5600 (5.6). The number of grid squares where the hard coating film did not peel off but remained was regarded as X, and the initial adhesiveness was expressed by X/100.

<3> Weather Resistance Test

A test piece of 25×25 mm was applied to 90 cycles (1080 hours) of three load conditions of light irradiation, dew, condensation, and darkness in succession using an accelerated weathering tester (manufactured by DIPLA WINTES CO., LTD.; DIPLA METAL WEATHER KW-R5TP-A) using a metal halide lamp as a light source. Here, the condition of the light irradiation was light irradiation for 4 hours at an illuminance of 80 mW/cm$^2$, a black panel temperature of 63° C., and a relative humidity of 80%, the condition of the dew condensation was natural cooling of the black panel temperature from 63° C. to 30° C. at a relative humidity of 98% without light irradiation and then keeping it for 4 hours, and the condition of the darkness was keeping it at a black panel temperature of 75° C. and a relative humidity of 90% without light irradiation for 4 hours. Further, a shower treatment with water before and after the dew condensation was performed for 10 seconds each.

<3-1> Weather-Crack Resistance (Durability Time (Hour))

In the above-described weather resistance test, the external appearance of the hard coating film was visually observed every time 10 cycles finished, and the number of cycles when an abnormality such as crack, peeling or the like was confirmed in the hard coating film was recorded. The durability time was calculated by multiplying the number of cycles immediately before the confirmation of the abnormality (unit of 10 cycles) by 12 hours.

<3-2> Weather Resistant Adhesiveness

A hard coating film of a resin substrate with a hard coating film other than the one which was subjected to the weather resistance test until the number of cycles immediately before the abnormality was confirmed in the above-described weather resistance test was subjected to a peeling test similar to the initial adhesiveness. The number of grid squares where the hard coating film did not peel off but remained was regarded as X, and the weather resistant adhesiveness was expressed by X/100.

TABLE 1

| EXAMPLE | PC Film Thickness (μm) | Coating Method | Primer Layer Film Thickness (μm) | Acrylic Polymer Molecular Weight Mw | Ultraviolet Absorbent Content (wt % Relative to 100 wt % of Resin) | Solvent Residual Amount (wt % Relative to 100 wt % of Total Solid Content) | Evaluation of Injection-Molded Product Primer Layer Surface External Appearance | Hard Coating Layer Coating Method |
|---|---|---|---|---|---|---|---|---|
| 1 | 200 | Die coating method | 4.9 | 340,000 | 30 | 0 | ○ | Flow coating method |
| 2 | 250 | Die coating method | 4.9 | 340,000 | 30 | 0 | ○ | Flow coating method |
| 3 | 250 | Spin coating method | 4.5 | 340,000 | 30 | 0.92 | ○ | Flow coating method |
| 4 | 250 | Die coating method | 4.9 | 340,000 | 30 | 0 | ○ | Dip coating method |
| 5 | 500 | Die coating method | 4.9 | 340,000 | 30 | 0 | X Cloudiness | Not formed |
| 6 | 130 | Die coating method | 4.9 | 340,000 | 30 | 0 | X Wrinkling | Not formed |
| 7 | 250 | Die coating method | 4.9 | 340,000 | 30 | 1.54 | Δ Cloudiness | Not formed |
| 8 | 250 | Die coating method | 4.9 | 340,000 | 30 | 6.15 | X Cloudiness | Not formed |
| 9 | 110 | Coextrusion molding | 15 | 99,000 | 0.75 | 0 | X Wrinlding | Not formed |
| 10 | 170 | Coextrusion molding | 30 | 99,000 | 0.75 | 0 | ○ | Flow coating method |

Evaluation Result of Resin Substrate with HC Film

| EXAMPLE | Abbreviation of Resin Substrate with HC Film | Initial External Appearance | Initial Haze Before Test | Initial Haze Difference ΔH500 between Before and After Test | Adhesiveness | After Weather Resistance Test Durability Time (Hour) | After Weather Resistance Test Weather Resistant Adhesiveness |
|---|---|---|---|---|---|---|---|
| 1 | 20A | ○ | 0.5 | 5.8 | 100/100 | 960 | 100/100 (After 960 Hr) |
| 2 | 20B | ○ | 0.9 | 6.3 | 100/100 | 960 | 100/100 (After 960 Hr) |
| 3 | 20C | ○ | 0.8 | 6.1 | 100/100 | 840 | 100/100 (After 840 Hr) |
| 4 | 20D | ○ | 0.7 | 5.5 | 100/100 | 600 | 100/100 (After 600 Hr) |
| 5 | — | — | — | — | — | — | — |
| 6 | — | — | — | — | — | — | — |
| 7 | — | — | — | — | — | — | — |
| 8 | — | — | — | — | — | — | — |
| 9 | — | — | — | — | — | — | — |
| 10 | 20E | ○ | 0.9 | 5.2 | 100/100 | 120 | 100/100 (After 120 Hr) |

Note that in Table 1, "PC" means polycarbonate, and "HC film" means a hard coating film. As is found from Table 1, the resin substrates with hard coating films 20A to 20E in Examples 1 to 4 and 10 each using the resin film laminate in which the primer layer was formed on the polycarbonate resin film having a thickness of 150 μm or more and 400 μm or less and the amount of the residual solvent in the primer layer was less than 1.5 mass % relative to 100 mass % of the total solid content (PMMA+DBR) in the primer layer, were excellent in external appearance of the surface of the primer layer of the resin substrate with a resin film laminate obtained in the injection molding.

However, in the resin substrate with a hard coating film 20E in Example 10 corresponding to a comparative example, the molecular weight of the PMMA resin in the primer layer formed by the coextrusion method was small and therefore the content of the ultraviolet absorbent was insufficient (due to the coextrusion method), resulting in an external appearance defect at an early stage in the weather resistance test.

The resin substrates with hard coating films 20A to 20D obtained in Examples 1 to 4 being examples of the present invention were excellent in external appearance of the hard coating film after the weather resistance test and also excellent in weather resistant adhesiveness.

In particular, the resin substrates with hard coating films 20A to 20C in Examples 1 to 3, in each of which the hard coating layer forming composition was applied by the flow coating, were excellent in external appearance of the hard coating film after the weather resistance test and also excellent in weather resistant adhesiveness as compared with the resin substrate with a hard coating film 20D in Example 4 in which the hard coating layer forming composition was applied by the dip coating method.

In Example 5, since the polycarbonate resin film having a thickness of more than 400 μm was used as a base material of the resin film laminate, the resin film laminate became too thick, so that the cooling effect by the mold became hard to be transmitted to the injected resin, resulting in that the resin film laminate melted on the polycarbonate resin film side with which the injected resin was in contact, and cloudiness occurred in the resin substrate with a resin film laminate before coating with the hard coating layer forming composition.

Further, in Example 6 and Example 9 in each of which a polycarbonate resin film having a thickness of less than 150 μm was used as a base material of the resin film laminate, since the flexural rigidity of the film was poor, the flow of the resin due to the injection molding caused wrinkling, resulting in a wrinkling-like external appearance defect on the surface of the resin substrate with a resin film laminate after molding.

Further, in Example 7 and Example 8 each containing 1.5 mass % or more of the residual solvent in the primer layer of the resin film laminate relative to 100 mass % of the total solid content (PMMA+DBR) in the primer layer, the solvent in the primer layer vaporized in the injection molding, resulting in vaporization mark like cloudiness on the primer layer of the surface of the resin substrate with a resin film laminate.

The resin substrate with a hard coating film efficiently obtained by the manufacturing method of the present invention is excellent in adhesiveness, abrasion resistance, and weather resistance, and can be preferably used as window glass for vehicles attached to automobiles and various transportation facilities, and window glass for building material attached to architectures such houses, buildings and the like.

What is claimed is:

1. A method for manufacturing a resin substrate with a hard coating film having a resin substrate formed by injection molding, a resin film on one main surface of the resin substrate and a hard coating film including at least a primer layer and a hard coating layer laminated on the resin film, the method comprising:
    a step (1) of preparing the resin film with a thickness of 150 to 400 μm and made of a same kind of resin as a resin constituting the resin substrate, applying a primer layer forming composition containing a primer resin component containing an acrylic polymer (A) having a mass average molecular weight of 200,000 to 1,000,000 as a main component and a solvent by a wet method on one main surface of the resin film and drying the primer layer forming composition to form the primer layer having a content of the solvent of less than 1.5 mass % relative to 100 mass % of a total solid content, to obtain a resin film laminate;
    a step (2) of forming the resin substrate by injection molding on another main surface of the resin film in the resin film laminate, to obtain a resin substrate with a resin film laminate; and
    a step (3) of applying a hard coating layer forming composition containing an organopolysiloxane (S) as a main component on the primer layer in the resin substrate with a resin film laminate and curing the hard coating layer forming composition, to obtain the resin substrate with a hard coating film.

2. The manufacturing method according to claim 1, wherein the resin constituting the resin substrate and the resin film is polycarbonate.

3. The manufacturing method according to claim 1, wherein the primer layer forming composition contains a non-polymerizable ultraviolet absorbent, and a content of the ultraviolet absorbent is 5 to 50 mass % relative to 100 mass % of the primer resin component.

4. The manufacturing method according to claim 1, wherein the organopolysiloxane (S) contains: an organopolysiloxane (a) containing silicon-containing bond units represented by following T1 to T3 at a ratio among numbers of the units of T1:T2:T3=0 to 5:30 to 45:50 to 70 and a ratio of T3/T2≥1.5, and having a ratio of the number of hydroxyl groups (Hy) bonded to silicon atoms relative to the number of alkoxy groups (Al) bonded to silicon atoms in a molecule, (Hy)/(Al) of 12.0 to 100 on a molecular average, and a mass average molecular weight of 800 to 8,000; and an organopolysiloxane (b) having silicon-containing bond units represented by the following T1 to T3 and having a mass average molecular weight of 1/10 to 1/1.5 times the mass average molecular weight of the organopolysiloxane (a) at a ratio of 100 to 500 mass % relative to 100 mass % of the organopolysiloxane (a), T1: R—Si(—OX)$_2$(—O*—)

T2: R—Si(—OX)(—O*—)$_2$

T3: R—Si(—O*—)$_3$ where R represents an alkyl group having 1 to 6 carbon atoms, X represents a hydrogen atom or an alkyl group having 1 to 3 carbon atoms, and O* represents an oxygen atom linking two silicon atoms.

5. The manufacturing method according to claim 1, wherein the application of the hard coating layer forming composition in the step (3) is performed by a flow coating method.

6. The manufacturing method according to claim 1, wherein the application of the hard coating layer forming composition in step (3) is performed by a wet method.

* * * * *